(12) United States Patent
Bankoski et al.

(10) Patent No.: US 12,120,345 B2
(45) Date of Patent: Oct. 15, 2024

(54) INTRA PREDICTION FOR IMAGE AND VIDEO COMPRESSION

(71) Applicant: GOOGLE LLC, Mountain View, CA (US)

(72) Inventors: James Bankoski, Los Gatos, CA (US); Debargha Mukherjee, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 171 days.

(21) Appl. No.: 17/793,620

(22) PCT Filed: May 14, 2020

(86) PCT No.: PCT/US2020/032857
§ 371 (c)(1),
(2) Date: Jul. 18, 2022

(87) PCT Pub. No.: WO2021/162723
PCT Pub. Date: Aug. 19, 2021

(65) Prior Publication Data
US 2023/0050660 A1  Feb. 16, 2023

Related U.S. Application Data

(60) Provisional application No. 62/976,001, filed on Feb. 13, 2020.

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
CPC .... H04N 19/593; H04N 19/105; H04N 19/11; H04N 19/159; H04N 19/167;
(Continued)

(56) References Cited

U.S. PATENT DOCUMENTS

| | | | |
|---|---|---|---|
| 10,225,578 B2 * | 3/2019 | Young | H04N 19/117 |
| 2006/0098735 A1 * | 5/2006 | Chang | H04N 19/533 |
| | | | 375/E7.101 |

(Continued)

FOREIGN PATENT DOCUMENTS

| | | |
|---|---|---|
| EP | 2 665 276 A1 | 11/2013 |
| EP | 3 301 931 A1 | 4/2018 |

(Continued)

OTHER PUBLICATIONS

International Search Report and Written Opinion of International Application No. PCT/US2020/032857, mailed Dec. 21, 2020, 21 pgs.

(Continued)

*Primary Examiner* — Dominic D Saltarelli
(74) *Attorney, Agent, or Firm* — Young Basile Hanlon & MacFarlane, P.C.

(57) ABSTRACT

A method for intra-prediction of a current block includes selecting peripheral pixels of the current block, where the peripheral pixels are used to generate a prediction block for (Continued)

the current block; for each prediction pixel of the prediction block, performing steps including selecting two respective pixels of the peripheral pixels; and calculating the prediction pixel by interpolating at least the two respective pixels; and coding a residual block corresponding to a difference between the current block and the prediction block.

20 Claims, 19 Drawing Sheets

(51) Int. Cl.
    H04N 19/11      (2014.01)
    H04N 19/159     (2014.01)
    H04N 19/167     (2014.01)
    H04N 19/176     (2014.01)
    H04N 19/182     (2014.01)
    H04N 19/196     (2014.01)
    H04N 19/59      (2014.01)

(52) U.S. Cl.
    CPC ......... *H04N 19/159* (2014.11); *H04N 19/167* (2014.11); *H04N 19/176* (2014.11); *H04N 19/182* (2014.11); *H04N 19/196* (2014.11); *H04N 19/59* (2014.11)

(58) Field of Classification Search
    CPC .. H04N 19/176; H04N 19/182; H04N 19/196; H04N 19/59
    USPC .................................................... 375/240.12
    See application file for complete search history.

(56) References Cited

U.S. PATENT DOCUMENTS

| | | | |
|---|---|---|---|
| 2011/0249739 A1* | 10/2011 | Liu | H04N 19/11 |
| | | | 375/E7.243 |
| 2017/0076434 A1 | 3/2017 | Pyo et al. | |
| 2018/0332282 A1* | 11/2018 | He | H04N 19/11 |
| 2019/0335199 A1* | 10/2019 | Joshi | H04N 19/12 |

FOREIGN PATENT DOCUMENTS

| | | |
|---|---|---|
| EP | 3 562 158 A1 | 10/2019 |
| WO | 2017/209793 A1 | 12/2017 |
| WO | 2018/026148 A1 | 2/2018 |
| WO | 2018/231087 A1 | 12/2018 |

OTHER PUBLICATIONS

International Search Report and Written Opinion of International Application No. PCT/US2020/032862, mailed Oct. 23, 2020, 16 pgs.

* cited by examiner

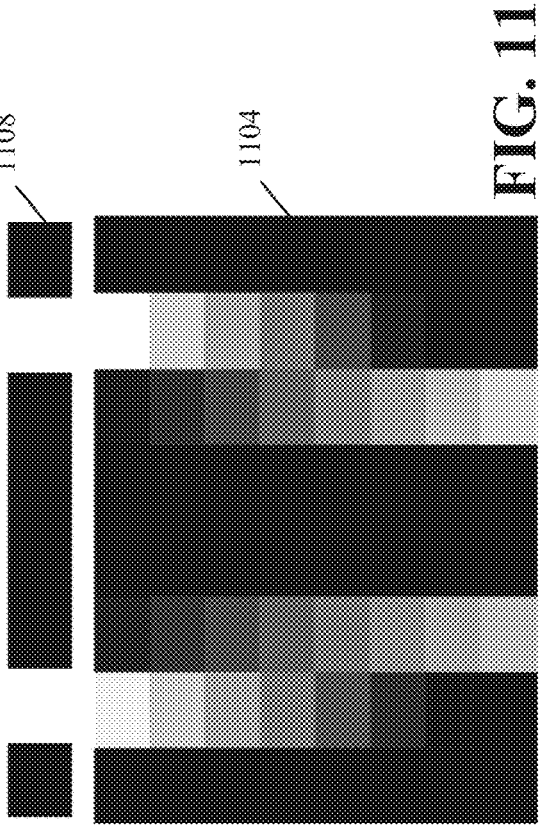
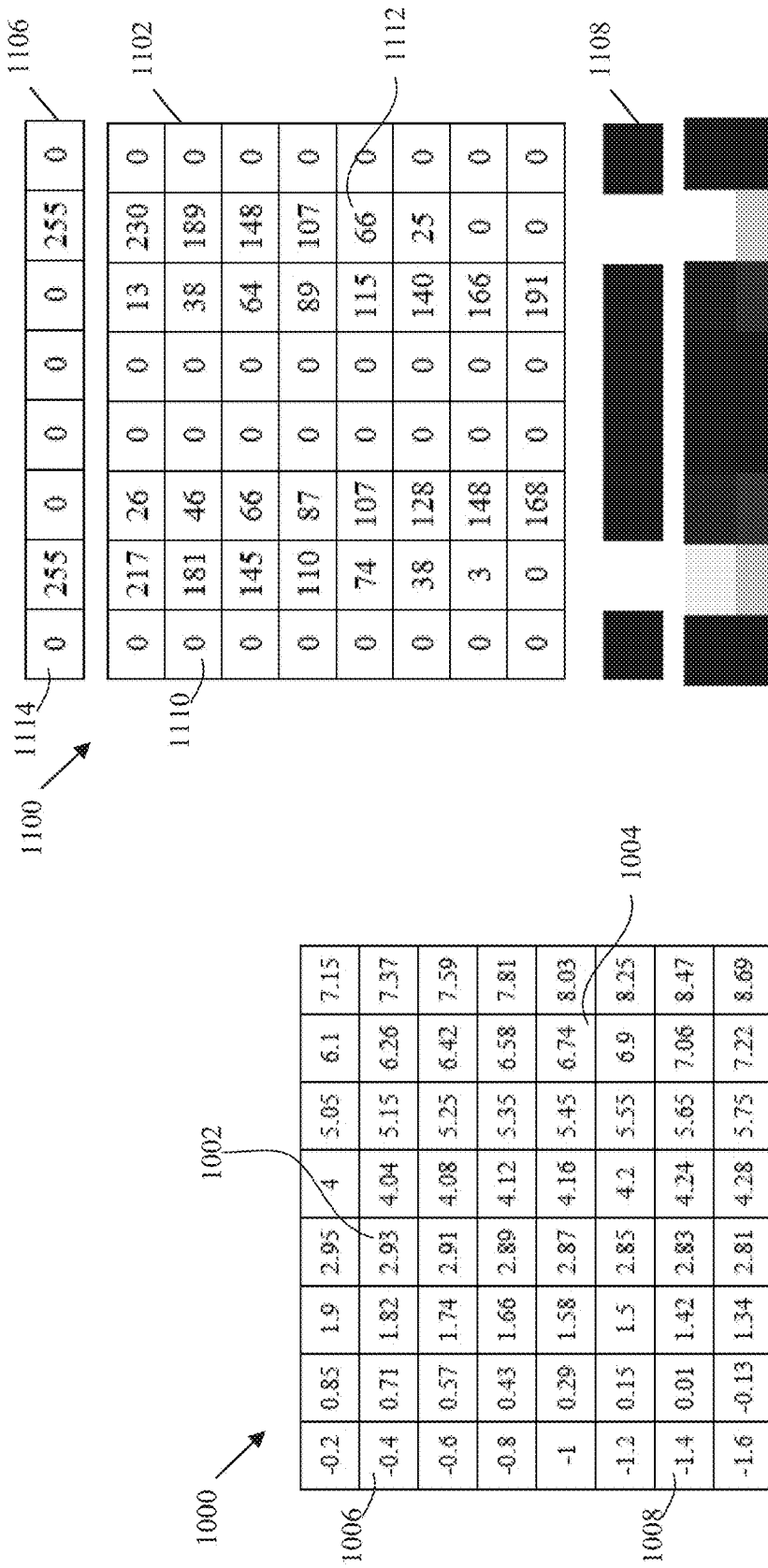
FIG. 11
FIG. 10

2010A — POSITION WITHIN ROW ABOVE

| 1.25 | 2.25 | 3.25 | 4.25 | 5.25 | 6.25 | 7.25 | 8.25 |
|---|---|---|---|---|---|---|---|
| 1.5 | 3.5 | 5.5 | 7.5 | 9.5 | 11.5 | 13.5 | 15.5 |
| 5.75 | 8.75 | 11.8 | 14.8 | 17.8 | 20.8 | 23.8 | 26.8 |
| 14 | 18 | 22 | 26 | 30 | 34 | 38 | 42 |
| 26.3 | 31.3 | 36.3 | 41.3 | 46.3 | 51.3 | 56.3 | 61.3 |
| 42.5 | 48.5 | 54.5 | 60.5 | 66.5 | 72.5 | 78.5 | 84.5 |
| 62.8 | 69.8 | 76.8 | 83.8 | 90.8 | 97.8 | 105 | 112 |
| 87 | 95 | 103 | 111 | 119 | 127 | 135 | 143 |

2012A — X-INTERCEPTS

| 5 | 9 | 13 | 17 | 21 | 25 | 29 | 33 |
|---|---|---|---|---|---|---|---|
| 6 | 4.67 | 4.4 | 4.29 | 4.22 | 4.18 | 4.15 | 4.13 |
| 3.63 | 3.89 | 4.03 | 4.12 | 4.18 | 4.22 | 4.25 | 4.28 |
| 4.31 | 4.5 | 4.63 | 4.73 | 4.8 | 4.86 | 4.9 | 4.94 |
| 5.2 | 5.34 | 5.45 | 5.54 | 5.61 | 5.66 | 5.71 | 5.75 |
| 6.14 | 6.26 | 6.35 | 6.42 | 6.49 | 6.54 | 6.59 | 6.63 |
| 7.11 | 7.21 | 7.28 | 7.35 | 7.41 | 7.46 | 7.5 | 7.54 |
| 8.09 | 8.17 | 8.24 | 8.3 | 8.35 | 8.4 | 8.44 | 8.47 |

2014A — DISTANCES TO ABOVE

| 1.03 | 1.03 | 1.03 | 1.03 | 1.03 | 1.03 | 1.03 | 1.03 |
|---|---|---|---|---|---|---|---|
| 2.06 | 2.5 | 3.2 | 4.03 | 4.92 | 5.85 | 6.8 | 7.76 |
| 5.62 | 7.39 | 9.25 | 11.2 | 13.1 | 15.1 | 17 | 19 |
| 13.6 | 16.5 | 19.4 | 22.4 | 25.3 | 28.3 | 31.3 | 34.2 |
| 25.7 | 29.7 | 33.6 | 37.6 | 41.6 | 45.5 | 49.5 | 53.5 |
| 41.9 | 46.9 | 51.9 | 56.8 | 61.8 | 66.8 | 71.8 | 76.7 |
| 62.2 | 68.1 | 74.1 | 80.1 | 86 | 92 | 98 | 104 |
| 86.4 | 93.3 | 100 | 107 | 114 | 121 | 128 | 135 |

2016A — DISTANCES TO LEFT

| 4.12 | 8.25 | 12.4 | 16.5 | 20.6 | 24.7 | 28.9 | 33 |
|---|---|---|---|---|---|---|---|
| 4.12 | 3.33 | 3.84 | 4.61 | 5.47 | 6.38 | 7.32 | 8.28 |
| 1.18 | 2.19 | 3.17 | 4.15 | 5.14 | 6.12 | 7.11 | 8.1 |
| 1.05 | 2.06 | 3.07 | 4.07 | 5.06 | 6.06 | 7.06 | 8.06 |
| 1.02 | 2.03 | 3.03 | 4.04 | 5.04 | 6.04 | 7.04 | 8.04 |
| 1.01 | 2.02 | 3.02 | 4.02 | 5.02 | 6.02 | 7.02 | 8.02 |
| 1.01 | 2.01 | 3.01 | 4.02 | 5.02 | 6.02 | 7.02 | 8.02 |
| 1 | 2.01 | 3.01 | 4.01 | 5.01 | 6.01 | 7.01 | 8.01 |

FIG. 20A

2050 — POSITION FROM COLUMN LEFT

| | | | | | | | |
|---|---|---|---|---|---|---|---|
| 5 | 9 | 13.3 | 17.8 | 22.5 | 27.5 | 32.8 | 38.3 |
| 6 | 11 | 16.3 | 21.8 | 27.5 | 33.5 | 39.8 | 46.3 |
| 7 | 13 | 19.3 | 25.8 | 32.5 | 39.5 | 46.8 | 54.3 |
| 8 | 15 | 22.3 | 29.8 | 37.5 | 45.5 | 53.8 | 62.3 |
| 9 | 17 | 25.3 | 33.8 | 42.5 | 51.5 | 60.8 | 70.3 |
| 10 | 19 | 28.3 | 37.8 | 47.5 | 57.5 | 67.8 | 78.3 |
| 11 | 21 | 31.3 | 41.8 | 52.5 | 63.5 | 74.8 | 86.3 |
| 12 | 23 | 34.3 | 45.8 | 57.5 | 69.5 | 81.8 | 94.3 |

2052 — Y-INTERCEPTS

| | | | | | | | |
|---|---|---|---|---|---|---|---|
| 1.25 | 2.25 | 3.24 | 4.24 | 5.23 | 6.23 | 7.22 | 8.21 |
| 1.5 | 2.44 | 3.42 | 4.41 | 5.39 | 6.38 | 7.37 | 8.36 |
| 1.75 | 2.6 | 3.55 | 4.53 | 5.51 | 6.49 | 7.48 | 8.47 |
| 2 | 2.73 | 3.66 | 4.62 | 5.6 | 6.58 | 7.56 | 8.55 |
| 2.25 | 2.83 | 3.74 | 4.7 | 5.67 | 6.65 | 7.63 | 8.61 |
| 2.5 | 2.92 | 3.81 | 4.76 | 5.72 | 6.7 | 7.68 | 8.66 |
| 2.75 | 3 | 3.87 | 4.81 | 5.77 | 6.74 | 7.72 | 8.71 |
| 3 | 3.07 | 3.91 | 4.85 | 5.81 | 6.78 | 7.76 | 8.74 |

2054 — DISTANCES TO ABOVE

| | | | | | |
|---|---|---|---|---|---|
| 1.03 | 1.03 | 1.03 | 1.03 | 1.02 | 1.02 |
| 2.06 | 2.05 | 2.04 | 2.04 | 2.03 | 2.03 |
| 3.09 | 3.06 | 3.05 | 3.04 | 3.04 | 3.04 |
| 4.12 | 4.07 | 4.05 | 4.04 | 4.04 | 4.04 |
| 5.15 | 5.07 | 5.05 | 5.04 | 5.04 | 5.04 |
| 6.18 | 6.07 | 6.05 | 6.04 | 6.04 | 6.04 |
| 7.22 | 7.07 | 7.05 | 7.04 | 7.04 | 7.04 |
| 8.25 | 8.07 | 8.05 | 8.04 | 8.04 | 8.03 |

2056 — DISTANCES TO ABOVE

| | | | | | | | |
|---|---|---|---|---|---|---|---|
| 4.12 | 8.25 | 12.6 | 17.2 | 22.1 | 27.2 | 32.5 | 38.1 |
| 4.12 | 9.22 | 14.6 | 20.2 | 26 | 32.1 | 38.4 | 45 |
| 4.12 | 10.2 | 16.5 | 23.1 | 29.9 | 37 | 44.3 | 51.9 |
| 4.12 | 11.2 | 18.5 | 26.1 | 33.9 | 41.9 | 50.2 | 58.8 |
| 4.12 | 12.2 | 20.5 | 29 | 37.8 | 46.9 | 56.2 | 65.7 |
| 4.12 | 13.2 | 22.5 | 32 | 41.8 | 51.9 | 62.2 | 72.7 |
| 4.12 | 14.1 | 24.4 | 35 | 45.8 | 56.8 | 68.1 | 79.7 |
| 4.12 | 15.1 | 26.4 | 38 | 49.8 | 61.8 | 74.1 | 86.6 |

FIG. 20B

INTRA PREDICTION FOR IMAGE AND VIDEO COMPRESSION

CROSS-REFERENCE TO RELATED APPLICATION(S)

This application claims priority to and the benefit of U.S. Provisional Patent Application No. 62/976,001, filed Feb. 13, 2020, the entire disclosure of which is hereby incorporated by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

Encoding based on spatial similarities may be performed by breaking a frame or image into blocks that are predicted based on other blocks within the same frame or image. Differences (i.e., residual errors) between blocks and prediction blocks are compressed and encoded in a bitstream. A decoder uses the differences and the reference frames to reconstruct the frames or images.

SUMMARY

Disclosed herein are aspects, features, elements, and implementations for encoding and decoding blocks using intra prediction.

One aspect of the disclosed implementations is a method for intra-prediction of a current block. The method includes selecting peripheral pixels of the current block, where the peripheral pixels are used to generate a prediction block for the current block; for each prediction pixel of the prediction block, performing steps including selecting two respective pixels of the peripheral pixels; and calculating the prediction pixel by interpolating at least the two respective pixels; and coding a residual block corresponding to a difference between the current block and the prediction block.

Another aspect is an apparatus for intra-prediction of a current block. The apparatus includes a memory and a processor. The processor is configured to execute instructions stored in the memory to select first peripheral pixels of the current block, wherein the first peripheral pixels are along a first edge of the current block; for each prediction pixel of the prediction block, perform instructions to determine a first intercept along a first continuous line that includes the first peripheral pixels at respective integer locations; determine, using a location of the each prediction pixel and the first intercept, a second intercept along a second continuous line, where the second continuous line includes second peripheral pixels, where the second peripheral pixels are along a second edge of the current block, and where the second edge is perpendicular to the first edge; and calculate, using at least one of the first intercept and the second intercept, a value for the each prediction pixel; and code a residual block corresponding to a difference between the current block and the prediction block.

Another aspect is a method of generating a prediction block for a current block using intra-prediction. The method includes determining peripheral pixels for generating the prediction block of the current block, where the peripheral pixels are integer pixel locations along a peripheral pixel line; determining a respective sub-pixel location of the peripheral pixel line for each pixel of the prediction block; and, for each prediction pixel of the prediction block, calculating the prediction pixel as an interpolation of nearest integer pixels of the peripheral pixels corresponding to the respective sub-pixel location of the each prediction pixel.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the methods. Aspects can be combined such that features described in the context of one aspect may be implemented in another aspect.

BRIEF DESCRIPTION OF THE DRAWINGS

The description herein makes reference to the accompanying drawings wherein like reference numerals refer to like parts throughout the several views.

FIG. 10 is an example of positions calculated by the technique of FIG. 9 according to implementations of this disclosure.

FIG. 11 is an example of a prediction block that is calculated from the example of FIG. 10.

FIGS. 20A-20B are examples used to illustrate the technique of FIG. 19.

DETAILED DESCRIPTION

Figure 1:
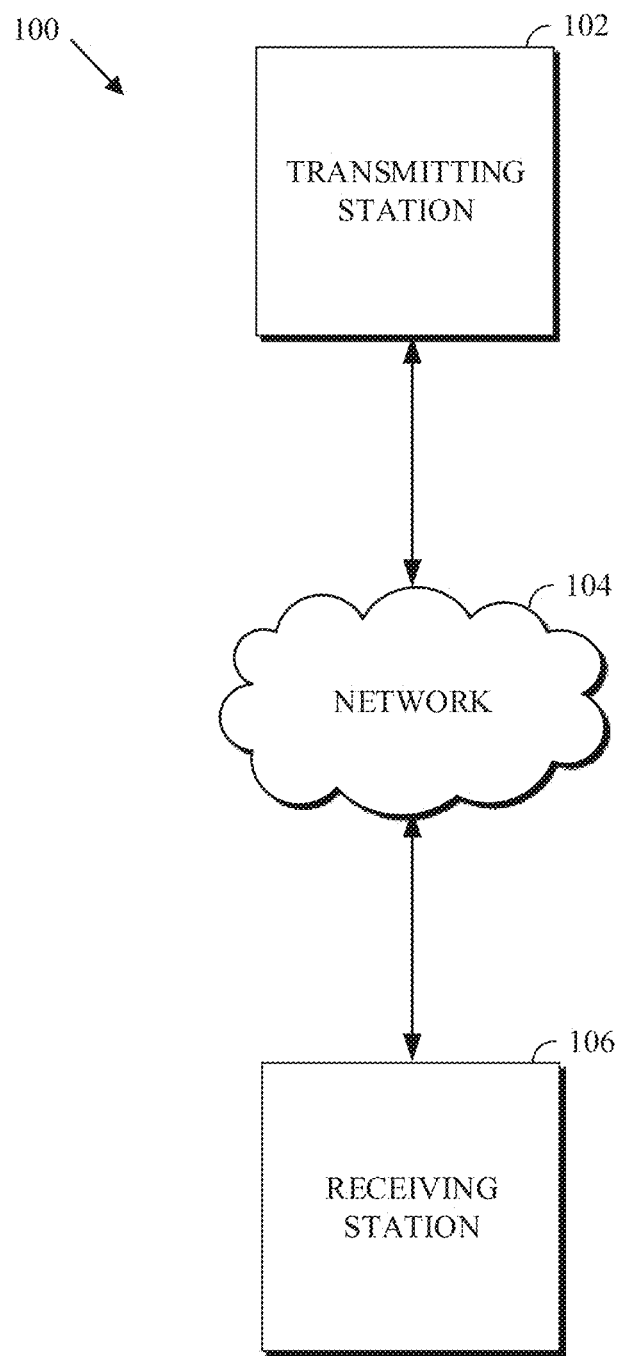
FIG. 1 is a schematic of a video encoding and decoding system.

As mentioned above, compression schemes related to coding video streams may include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities can be known as intra prediction. Intra prediction attempts to predict the pixel values of a current block of a frame (i.e., an image, a picture) of a video stream, or of a single image, using pixels peripheral to the current block; that is, using pixels that are in the same frame as the current block but that are outside of the current block. Intra prediction can be performed along a direction of prediction, referred to herein as prediction angle, where each direction can correspond to an intra prediction mode. An intra prediction mode uses pixels peripheral to the current block being predicted. Pixels peripheral to the current block are pixels outside the current block. The intra prediction mode can be signalled by an encoder to a decoder.

Many different intra prediction modes can be supported. Some intra prediction modes use a single value for all pixels within the prediction block generated using at least one of the peripheral pixels. Others are referred to as directional intra prediction modes, which each has a corresponding prediction angle. Intra prediction modes can include, for example, horizontal intra prediction mode, vertical intra prediction mode, and various other directional intra prediction modes. For example, a codec can have available prediction modes corresponding to 50-60 prediction angles. Examples of intra-prediction modes are described with respect to FIG. 7.

However, intra-prediction modes of current codecs, such as those described above and with respect to FIG. 7, may not be able to optimally code blocks of images or scenes that include parallel lines. As is known, a perspective representation of a scene (e.g., an image), or an that is viewed at an angle, where the image includes parallel lines, can have one or more vanishing points. That is, parallel lines can be perceived (i.e., seen) to be converging to (or diverging from) a vanishing point (or a focal point). Non-limiting examples of images that include parallel lines or checkerboard patterns include striped shirts, bricks on a building, window blinds, train tracks, paneled wood flooring, sun rays, tree trunks, and so on. While for ease of description, parallel lines are used herein, the disclosure is not so limited. For example, the disclosure herein can be used with parallel edges (such as the edges of a pencil in an image where the image is taken from the point of the point). Additionally, the disclosure is not limited to straight lines. The parameters described below can be used to cover curves in a predictor line.

Such patterns can be easily recognized by sight. However, such patterns can be significantly more difficult to programmatically discern and encode when viewed from a perspective that's at a non-90 degree angle. As already mentioned, parallel lines can appear to come to a point in the distance, such as described with respect to FIG. 8, which shows converging railroad tracks.

While some intra-prediction modes can have an associated direction, that same direction is used to generate each of the prediction pixels of the prediction block. However with respect to converging lines (such as the railroad tracks of FIG. 8), each of the lines can have a different direction. Thus, singular direction intra-prediction modes may not generate the most optimal prediction blocks for coding a current block. By optimal prediction block is meant a prediction block that minimizes the residual error between the prediction block and the current block being encoded.

Implementations according to this disclosure use novel intra-prediction modes that can be used to code blocks that include converging lines. As indicated above, an intra prediction mode uses pixels peripheral to the current block. At a high level, a prediction block that is generated using an intra-prediction mode according to implementations of this disclosure can be such that one pixel of a row of the prediction block can be copied from one or more peripheral pixels along one direction while another pixel of the same row of the prediction block can be copied from one or more other peripheral pixels along a different direction. Additionally, a zooming (in or out) can optionally be applied according to parameters of the intra-prediction mode, as further described below.

In some embodiments, to generate a prediction block according to an intra-prediction mode of this disclosure, the same set of peripheral pixels, which are typically used in intra-prediction (i.e., the above and/or the left peripheral pixels), are resampled over and over for each pixel (i.e., pixel location) of the prediction block. The peripheral pixels are treated as a continuous line of pixel values, which, for ease of reference, is referred herein as a peripheral pixel line. To generate the prediction pixels of the prediction block, different positions of the peripheral pixel line are considered. However, each time a position is considered, the position is shifted from an immediately preceding position according to parameters of the intra-prediction mode, as further described below. It is to be noted that, of the pixel locations of the peripheral pixel line, only pixel values at integer locations are known: the peripheral pixels themselves. As such, a sub-pixel (i.e., non-integer pixel) value of the peripheral pixel line is obtained from the peripheral pixels using, for example, an interpolation or a filtering operation.

In other embodiments, a directional prediction mode can be used to generate an initial prediction block. A warp (e.g., a warping function, a set of warping parameters, etc.) can then be applied of the initial prediction block to generate the prediction block. In an example, the warp can be a perspective warp. In an example, the warp can be an affine warp.

In yet other embodiments, intra-prediction modes according to this disclosure can use a focal point that is at a distant away from the current block. The focal point can be considered to be a point in space where all the pixels of the current block emanate from or converge to. For each prediction pixel location of the prediction block, a line connecting the pixel location to the focal point is drawn. The x- and y-intercepts of where the line intercepts the x-axis and the y-axis of a coordinate system that is formed by the left and above peripheral pixels are determined. The x- and y-intercepts are used to determine (e.g., identify, select, calculate, etc.) the peripheral pixels that are used to calculate the value of the prediction pixel.

Figure 7:
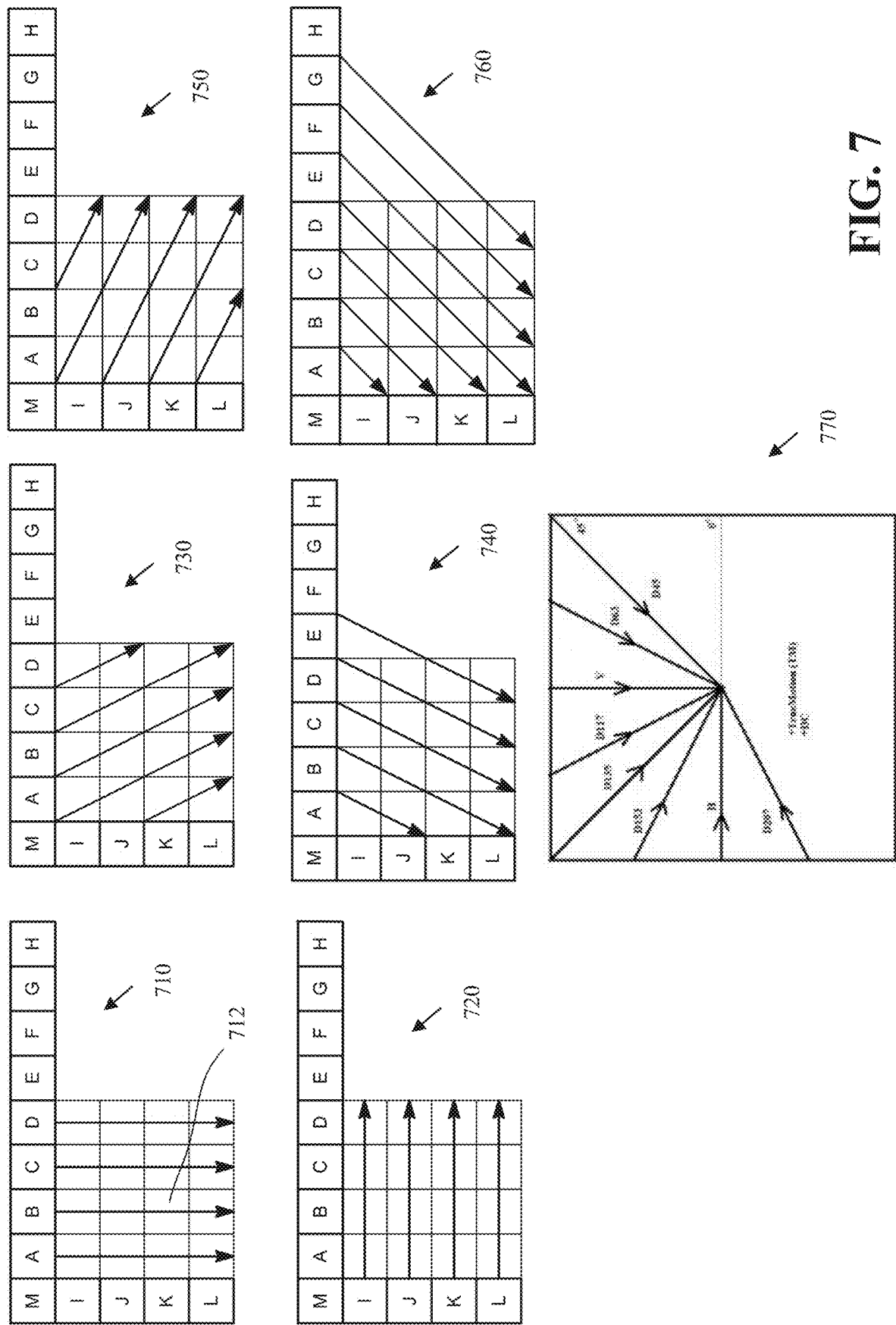
FIG. 7 is a diagram of examples of intra prediction modes.

To summarize, for all pixels of a prediction block, directional prediction modes, such as those described with respect to FIG. 7, result in parallel prediction lines. However, intra-prediction modes according to implementations of this disclosure result in non-parallel prediction lines. As such, at least two prediction pixels can be calculated according to different prediction angles.

While the intra-prediction modes according to this disclosure may result in two or more prediction pixels being derived (e.g., calculated) using parallel prediction lines (i.e., the same prediction angles), that is by mere happenstance, as compared to the design and semantics of traditional direction prediction modes where each of the prediction pixels are calculated according to the same prediction angle. For example, while, depending on the location of the focal point, more than one prediction pixel can have the same prediction angle, the intra-prediction modes according to implementations of this disclosure are such that not all of the prediction pixels can have the same prediction angle.

Details are described herein after first describing an environment in which the intra prediction for image and video compression disclosed herein may be implemented. While intra-prediction modes according to this disclosure are described with respect to a video encoder and a video decoder, the intra-prediction modes can also be used in an image codec. The image codec can be or can share many aspect of the video codecs described herein.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
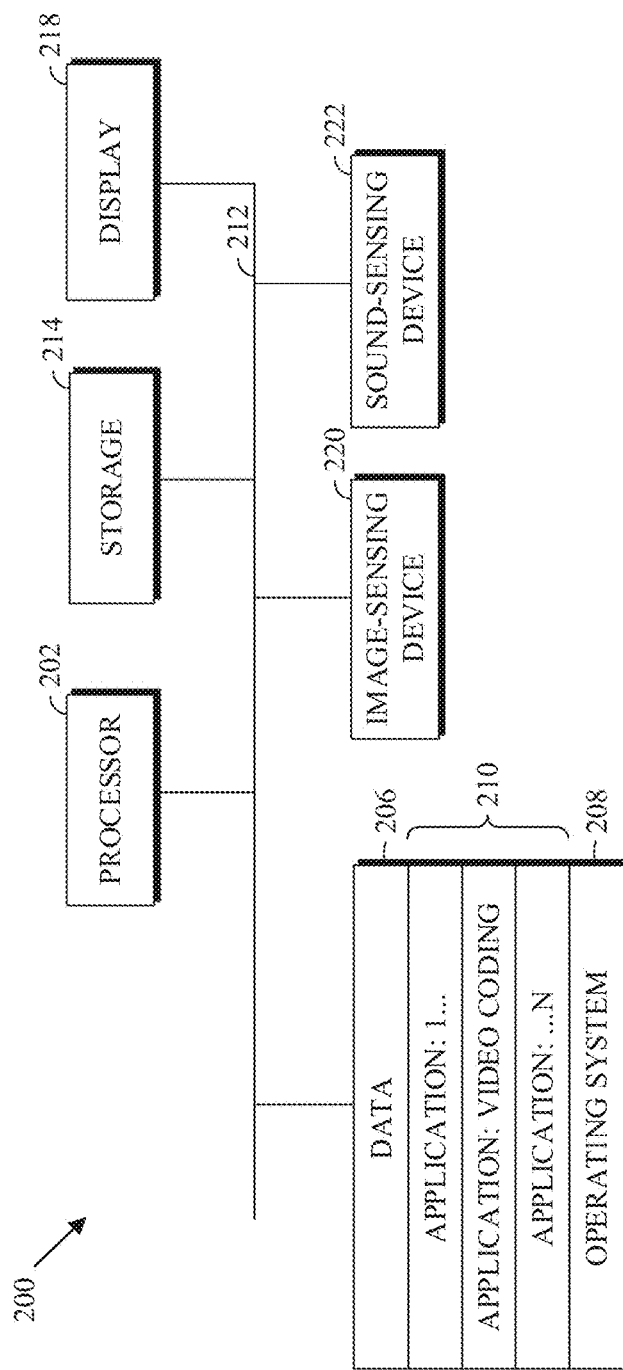
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hyper-Text Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
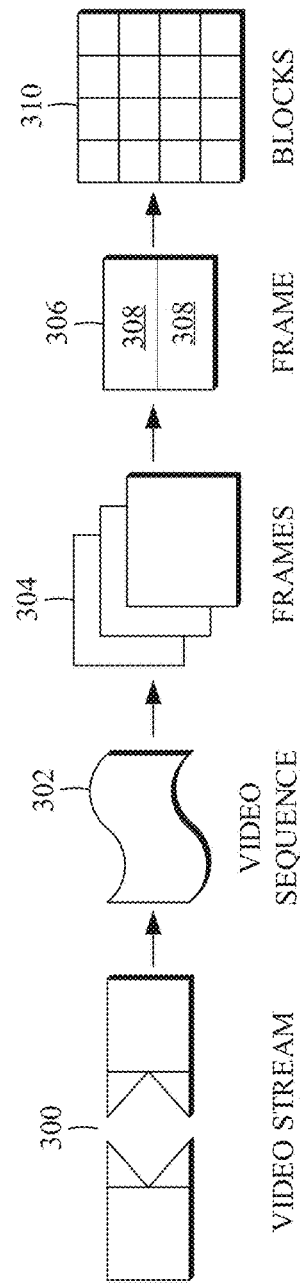
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
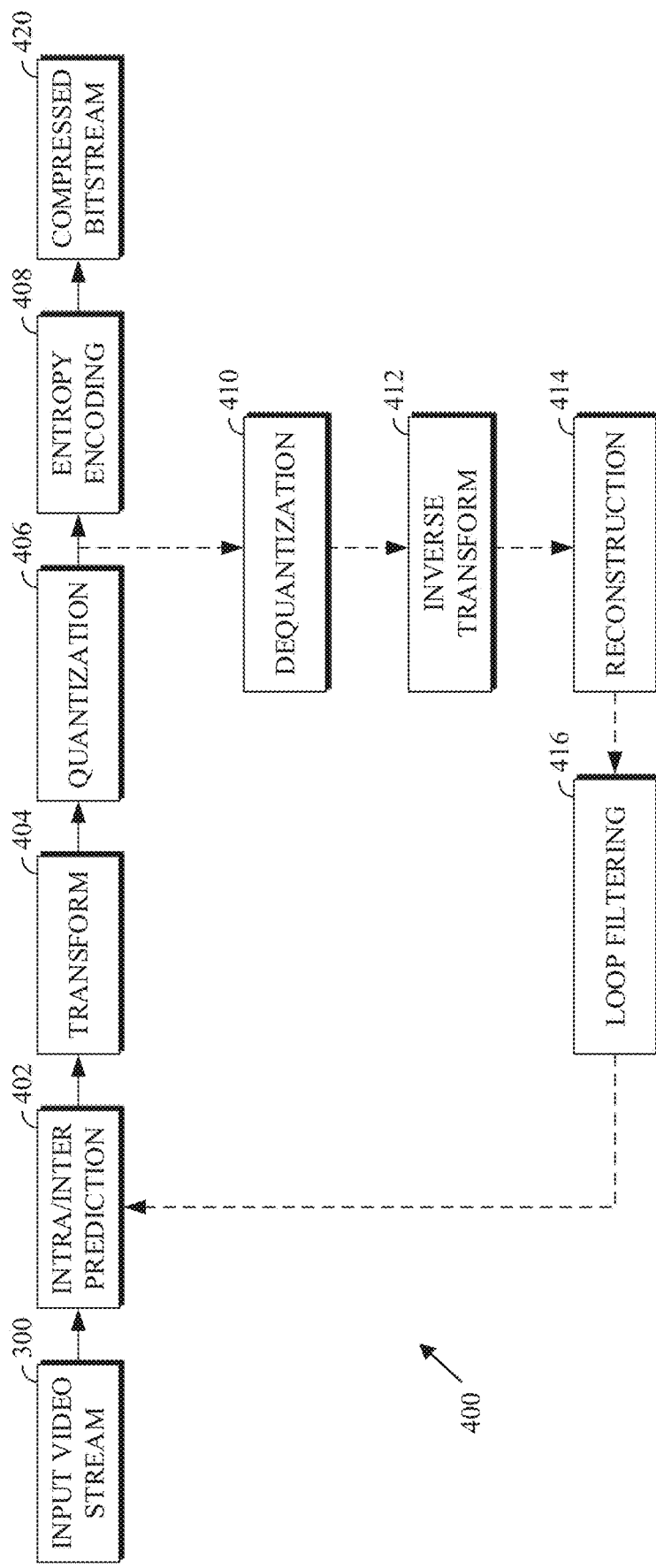
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
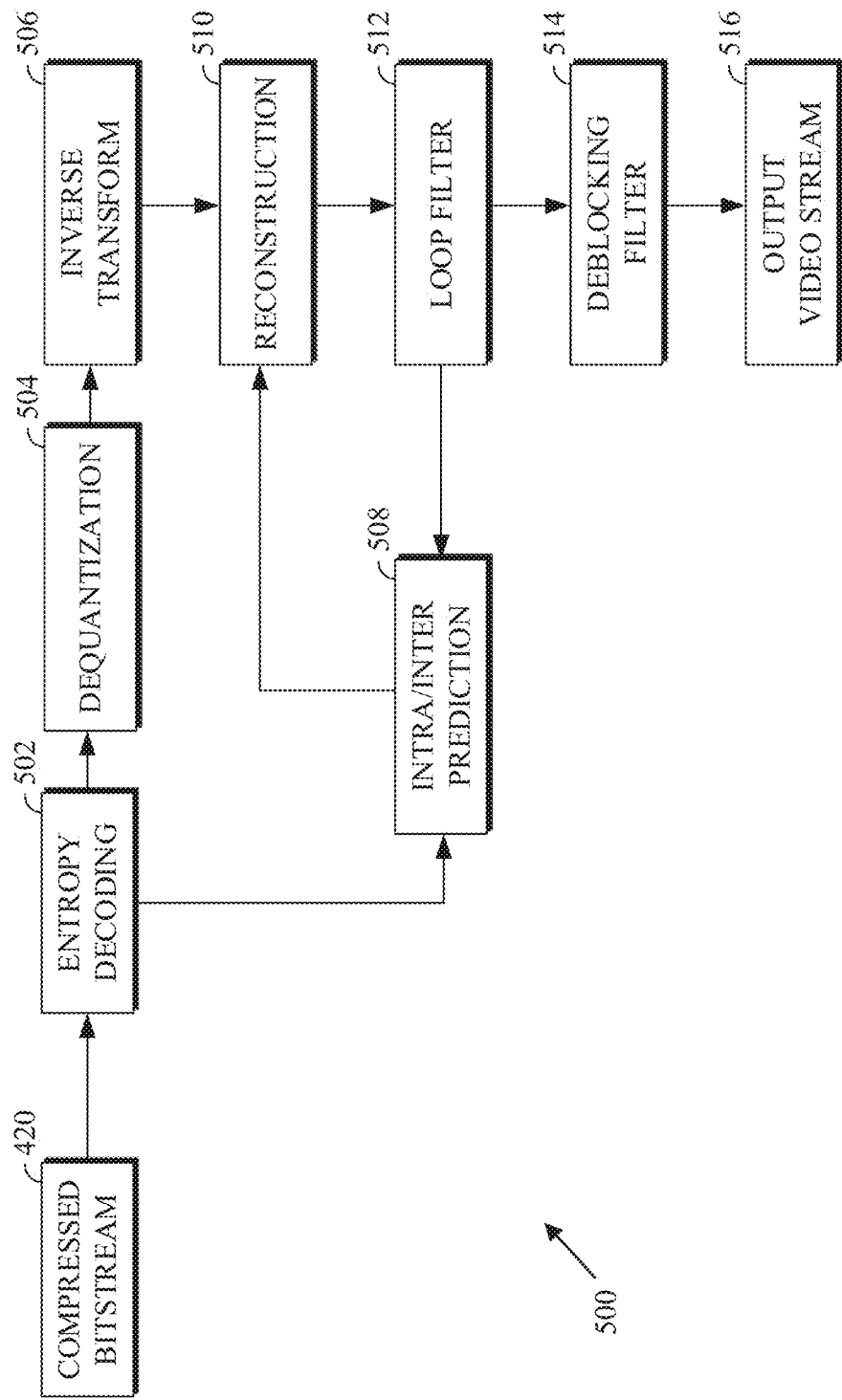
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described herein. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations of the decoder 500, the deblocking filtering stage 514 is applied before the loop filtering stage 512. Additionally, or alternatively, the encoder 400 includes a deblocking filtering stage in addition to the loop filtering stage 416.

Figure 6:
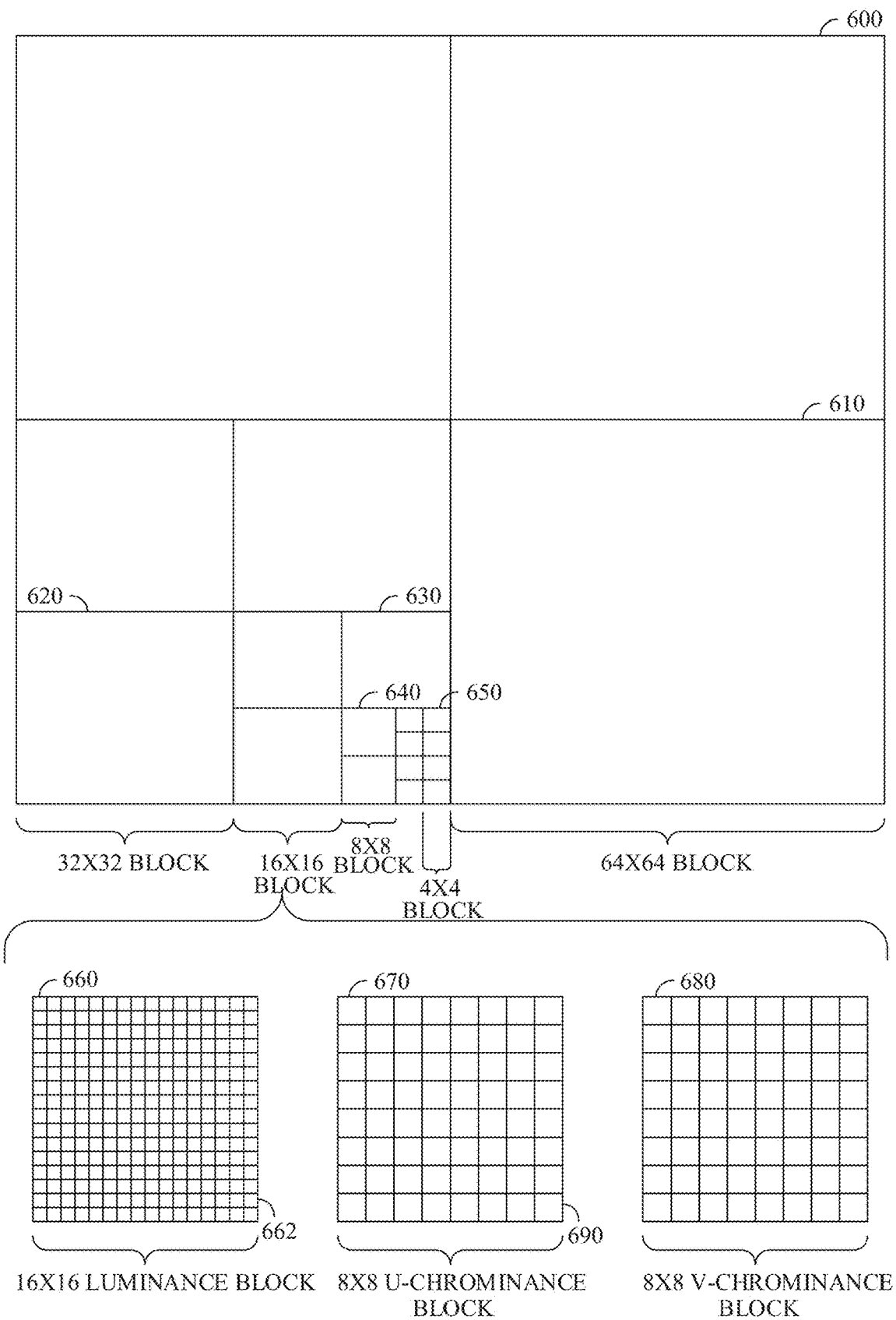
FIG. 6 is a block diagram of a representation of a portion of a frame according to implementations of this disclosure.

FIG. 6 is a block diagram of a representation of a portion 600 of a frame, such as the frame 306 of FIG. 3, according to implementations of this disclosure. As shown, the portion 600 of the frame includes four 64×64 blocks 610, which may be referred to as superblocks, in two rows and two columns in a matrix or Cartesian plane. A superblock can have a larger or a smaller size. While FIG. 6 is explained with respect to a superblock of size 64×64, the description is easily extendable to larger (e.g., 128×128) or smaller superblock sizes.

In an example, and without loss of generality, a superblock can be a basic or maximum coding unit (CU). Each superblock can include four 32×32 blocks 620. Each 32×32 block 620 can include four 16×16 blocks 630. Each 16×16 block 630 can include four 8×8 blocks 640. Each 8×8 block 640 can include four 4×4 blocks 650. Each 4×4 block 650 can include 16 pixels, which can be represented in four rows and four columns in each respective block in the Cartesian plane or matrix. The pixels can include information representing an image captured in the frame, such as luminance information, color information, and location information. In an example, a block, such as a 16×16-pixel block as shown, can include a luminance block 660, which can include luminance pixels 662; and two chrominance blocks 670/680, such as a U or Cb chrominance block 670, and a V or Cr chrominance block 680. The chrominance blocks 670/680 can include chrominance pixels 690. For example, the luminance block 660 can include 16×16 luminance pixels 662, and each chrominance block 670/680 can include 8×8 chrominance pixels 690, as shown. Although one arrangement of blocks is shown, any arrangement can be used. Although FIG. 6 shows N×N blocks, in some implementations, N×M, where M≠M, blocks can be used. For example, 32×64 blocks, 64×32 blocks, 16×32 blocks, 32×16 blocks, or any other size blocks can be used. In some implementations, N×2N blocks, 2N×N blocks, or a combination thereof can be used.

In some implementations, video coding can include ordered block-level coding. Ordered block-level coding can include coding blocks of a frame in an order, such as raster-scan order, wherein blocks can be identified and processed starting with a block in the upper left corner of the frame, or a portion of the frame, and proceeding along rows from left to right and from the top row to the bottom row, identifying each block in turn for processing. For example, the superblock in the top row and left column of a frame can be the first block coded, and the superblock immediately to the right of the first block can be the second block coded. The second row from the top can be the second row coded, such that the superblock in the left column of the second row can be coded after the superblock in the rightmost column of the first row.

In an example, coding a block can include using quad-tree coding, which can include coding smaller block units with a block in raster-scan order. The 64×64 superblock shown in the bottom-left corner of the portion of the frame shown in FIG. 6, for example, can be coded using quad-tree coding in which the top-left 32×32 block can be coded, then the top-right 32×32 block can be coded, then the bottom-left 32×32 block can be coded, and then the bottom-right 32×32 block can be coded. Each 32×32 block can be coded using quad-tree coding in which the top-left 16×16 block can be coded, then the top-right 16×16 block can be coded, then the bottom-left 16×16 block can be coded, and then the bottom-right 16×16 block can be coded. Each 16×16 block can be coded using quad-tree coding in which the top-left 8×8 block can be coded, then the top-right 8×8 block can be coded, then the bottom-left 8×8 block can be coded, and then the bottom-right 8×8 block can be coded. Each 8×8 block can be coded using quad-tree coding in which the top-left 4×4 block can be coded, then the top-right 4×4 block can be coded, then the bottom-left 4×4 block can be coded, and then the bottom-right 4×4 block can be coded. In some implementations, 8×8 blocks can be omitted for a 16×16 block, and the 16×16 block can be coded using quad-tree coding in which the top-left 4×4 block can be coded, and then the other 4×4 blocks in the 16×16 block can be coded in raster-scan order.

In an example, video coding can include compressing the information included in an original, or input, frame by omitting some of the information in the original frame from a corresponding encoded frame. For example, coding can include reducing spectral redundancy, reducing spatial redundancy, reducing temporal redundancy, or a combination thereof.

In an example, reducing spectral redundancy can include using a color model based on a luminance component (Y) and two chrominance components (U and V or Cb and Cr), which can be referred to as the YUV or YCbCr color model or color space. Using the YUV color model can include using a relatively large amount of information to represent the luminance component of a portion of a frame and using a relatively small amount of information to represent each corresponding chrominance component for the portion of the frame. For example, a portion of a frame can be represented by a high-resolution luminance component, which can include a 16×16 block of pixels, and by two lower resolution chrominance components, each of which representing the portion of the frame as an 8×8 block of pixels. A pixel can indicate a value (e.g., a value in the range from 0 to 255) and can be stored or transmitted using, for example, eight bits. Although this disclosure is described with reference to the YUV color model, any color model can be used.

Reducing spatial redundancy can include transforming a block into the frequency domain as described above. For example, a unit of an encoder, such as the entropy encoding stage 408 of FIG. 4, can perform a DCT using transform coefficient values based on spatial frequency.

Reducing temporal redundancy can include using similarities between frames to encode a frame using a relatively small amount of data based on one or more reference frames, which can be previously encoded, decoded, and reconstructed frames of the video stream. For example, a block or a pixel of a current frame can be similar to a spatially corresponding block or pixel of a reference frame. A block or a pixel of a current frame can be similar to a block or a pixel of a reference frame at a different spatial location. As such, reducing temporal redundancy can include generating motion information indicating the spatial difference (e.g., a translation between the location of the block or the pixel in the current frame and the corresponding location of the block or the pixel in the reference frame).

Reducing temporal redundancy can include identifying a block or a pixel in a reference frame, or a portion of the reference frame, that corresponds with a current block or pixel of a current frame. For example, a reference frame, or a portion of a reference frame, which can be stored in memory, can be searched for the best block or pixel to use for encoding a current block or pixel of the current frame. For example, the search may identify the block of the reference frame for which the difference in pixel values between the reference block and the current block is minimized, and can be referred to as motion searching. The portion of the reference frame searched can be limited. For example, the portion of the reference frame searched, which can be referred to as the search area, can include a limited number of rows of the reference frame. In an example, identifying the reference block can include calculating a cost function, such as a sum of absolute differences (SAD), between the pixels of the blocks in the search area and the pixels of the current block.

As mentioned above, a current block can be predicted using intra prediction. An intra prediction mode uses pixels peripheral to the current block being predicted. Pixels peripheral to the current block are pixels outside the current block. Many different intra prediction modes can be available. FIG. 7 is a diagram of examples of intra prediction modes.

Some intra prediction modes use a single value for all pixels within the prediction block generated using at least one of the peripheral pixels. As an example, the VP9 codec includes an intra-prediction mode, referred to as true-motion (TM_PRED) mode in which all values of a prediction block have the value predicted pixel (x, y)=(top neighbor+left neighbor−topleft neighbor) for all x and y. As another example, a DC intra-prediction mode (DC_PRED) is such that each pixel of the prediction block is set to the value predicted pixel (x, y)=average value of entire top row and left column.

Other intra prediction modes, which may be referred to as directional intra prediction modes, are such that each can have a corresponding prediction angle.

An intra prediction mode may be selected by the encoder as part of a rate distortion loop. In brief, various intra prediction modes may be tested to determine which type of prediction will have the lowest distortion for a given rate, or number of bits to be transmitted in an encoded video bitstream, including overhead bits included in the bitstream to indicate the type of prediction used.

In an example codec, the following 13 intra prediction modes can be available: DC_PRED, V_PRED, H_PRED, D45_PRED, D135_PRED, D117_PRED, D153_PRED, D207_PRED, D63_PRED, SMOOTH_PRED, SMOOTH_V_PRED, and SMOOTH_H_PRED, and PAETH_PRED. One of the 13 intra prediction modes can be used to predict a luminance block.

Intra prediction mode 710 illustrates the V_PRED intra prediction mode, which is referred to generally as a vertical intra prediction mode. In this mode, prediction block pixels in the first column are set to the value of peripheral pixel A; prediction block pixels in the second column are set to the value of pixel B; prediction block pixels in the third column are set to the value of pixel C; and prediction block pixels in the fourth column are set to the value of pixel D.

Intra prediction mode 720 illustrates the H_PRED intra prediction mode, which is referred to generally as a horizontal intra prediction mode. In this mode, prediction block pixels in the first row are set to the value of peripheral pixel I; prediction block pixels in the second row are set to the value of pixel J; prediction block pixels in the third row are set to the value of pixel K; and prediction block pixels in the fourth row are set to the value of pixel L.

Intra prediction mode 730 illustrates the D117_PRED intra prediction mode, so-called because the direction of the arrows, along which the peripheral pixels will be propagated to generate the prediction block form a diagonal, is at an angle of about 117° from the horizontal. That is, in the D117_PRED, the prediction angle is 117°. Intra prediction mode 740 illustrates the D63_PRED intra prediction mode, which corresponds to a prediction angle of 63°. Intra prediction mode 750 illustrates the D153_PRED intra prediction mode, which corresponds to a prediction angle of 153°. Intra prediction mode 760 illustrates the D135_PRED intra prediction mode, which corresponds to a prediction angle of 135°.

The prediction modes D45_PRED and D207_PRED (not shown) correspond, respectively, to the prediction angles 45° and 207°. DC_PRED corresponds to a prediction mode where all prediction block pixels are set to a single value that is a combination of the peripheral pixels A-M.

In the PAETH_PRED intra prediction mode, the prediction value of a pixel is determined as follows: 1) calculate a base value as a combination of some peripheral pixels, and 2) use, as the prediction pixel, the one of the some peripheral pixels that is closest to the base value. The PAETH_PRED intra prediction mode is illustrated using, as an example, a pixel 712 (at location x=1, y=2). In an example of a combination of some peripheral pixels, the base value can be calculated as base=B+K−M. That is, the base value is equal to: the value of the left peripheral pixel that is in the same row as the pixel to be predicted+the value of the above peripheral pixel that is in the same column as the pixel−the value of the pixel in the top-left corner.

In the SMOOTH_V intra prediction mode, the prediction pixels of the bottom-most row of the prediction block are estimated with the value of the last pixel in the left column (i.e., the value of pixel at location L). The remaining pixels of the prediction block are calculated by quadratic interpolation in the vertical direction.

In the SMOOTH_H intra prediction mode, the prediction pixels of the right-most column of the prediction block are estimated with the value of the last pixel in the top row (i.e., the value of pixel at location D). The remaining pixels of the prediction block are calculated by quadratic interpolation in the horizontal direction.

In the SMOOTH_PRED intra prediction mode, the prediction pixels of the bottom-most row of the prediction block are estimated with the value of the last pixel in the left column (i.e., the value of pixel at location L) and the prediction pixels of the right-most column of the prediction block are estimated with the value of the last pixel in the top row (i.e., the value of pixel at location D). The remaining pixels of the prediction block are calculated as scaled weighted sums. For example, the value of a prediction pixel at location (i, j) of the prediction block can be calculated as the scaled weighted sum of the values of pixels $L_j$, R, $T_i$ and B. The pixel $L_j$ is a pixel in the left column and on the same row as the prediction pixel. The pixel R is the pixel as provided by SMOOTH_H. The pixel $T_i$ is a pixel in the above row and on the same column as the prediction pixel. The pixel B is the pixel as provided by SMOOTH_V. The weights can be equivalent to a quadratic interpolation in the horizontal and vertical directions.

The intra prediction mode selected by the encoder can be transmitted to a decoder in the bitstream. The intra prediction mode can be entropy coded (encoded by the encoder and/or decoded by a decoder) using a context model.

Some codecs use the intra prediction modes of the left and above neighbor blocks as the context for coding the intra prediction mode of a current block. Using FIG. 7 as an example, the left neighbor block can be the block containing the pixels I-L, and the above neighbor block can be the block containing the pixels A-D.

A diagram 770 illustrates the intra-prediction modes available in the VP9 codec. The VP9 coded supports a set of 10 intra-prediction modes for block sizes ranging from 4×4 up to 32×32. These intra-prediction modes are DC_PRED, TM_PRED, H_PRED, V_PRED, and 6 oblique directional prediction modes: D45_PRED, D63_PRED, D117_PRED, D135_PRED, D153_PRED, D207_PRED, corresponding approximately to angles 45, 63, 117, 135, 153, and 207 degrees (counter-clockwise measured against the horizontal axis).

Figure 8:
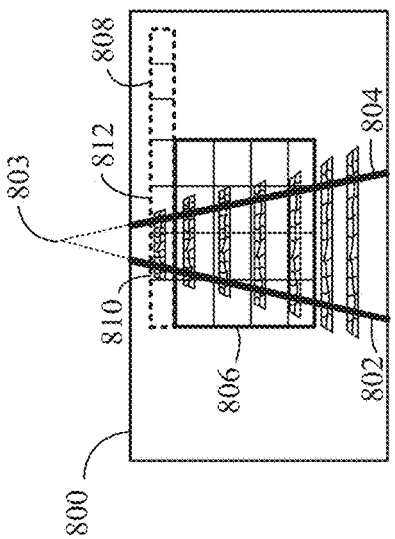
FIG. 8 is an example of an image portion that includes railroad tracks.

FIG. 8 is an example of an image portion 800 that includes railroad tracks. The image portion 800 includes a first rail track 802 and a second rail track 804. In real life, the first rail track 802 and the second rail track 804 are parallel. However, in the image portion 800 the first rail track 802 and the second rail track 804 are shown to converge at a focal point 803, which is outside of the image portion 800.

For illustration and clearer visualization purposes, a current block 806 is superimposed over part of the image portion 800. It is to be noted that, typically, each location (i.e., cell) of a current block corresponds to, or represents, one pixel. However, for illustration and clarity purposes, each cell of the current block 806 clearly includes significantly more than one pixel. It is also to be noted that, while not specifically marked, each of the first rail track 802 and the second rail track 804 includes a pair of inner and outer lines. The lines of each pair of the lines are also parallel and would converge in the image portion 800 at another focal point.

The image portion 800 also includes peripheral pixels 808. The peripheral pixels are shown to be above the current block 806. However, as described above, peripheral pixels can be above pixels, a top-left pixel, left pixels, or a combination thereof.

A cell 810 includes a portion of the first rail track 802. That portion propagates in a south-west direction into the current block 806. However, the portion of the second rail track 804 shown in a cell 812 propagates in a south-east direction into the current block 806.

As mentioned above, single-direction intra-prediction modes cannot adequately predict the current block 806 from the peripheral pixels 808.

Figure 9:
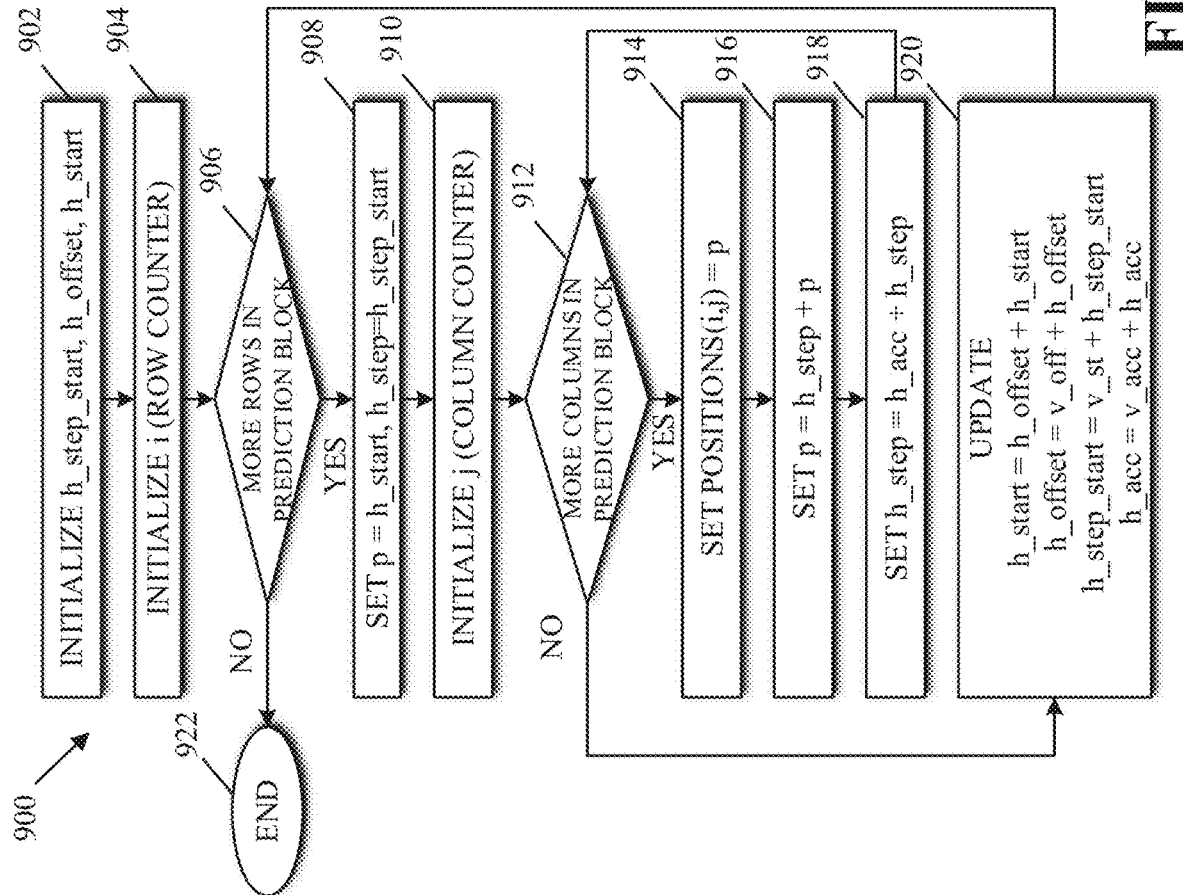
FIG. 9 is an example of a flowchart of a technique for determining positions along a peripheral pixel line for determining prediction pixel values according to an implementation of this disclosure.

FIG. 9 is an example of a flowchart of a technique 900 for determining (e.g., selecting, calculating, deriving, etc.) positions along a peripheral pixel line (i.e., an above peripheral pixel line) for determining prediction pixel values according to an implementation of this disclosure. The technique 900 for deriving locations is a mere example and other techniques are possible. For a prediction block (or, equivalently, a current block) of size M×N, the technique 900 calculates a block (e.g., a 2-dimensional array) of size M×N. The 2-dimensional array is referred to below as the array POSITIONS.

The technique 900 can be implemented, for example, as a software program that may be executed by computing devices such as a transmitting station 102 or a receiving station 106. The software program can include machine-readable instructions that may be stored in a memory such as the memory 204 or the secondary storage 214, and that, when executed by a processor, such as CPU 202, may cause the computing device to perform the technique 900. The technique 900 can be implemented in whole or in part in the intra/inter prediction stage 402 of the encoder 400 of FIG. 4 and/or the intra/inter-prediction stage 508 of the decoder 500 of FIG. 5I. The technique 900 can be implemented using specialized hardware or firmware. Multiple processors, memories, or both, may be used.

Given a current block and a set of above peripheral pixels (i.e., at integer peripheral pixel locations), the technique 900 determines, for each prediction pixel (i.e., or equivalently, each prediction pixel location) of the prediction block, a location along the above peripheral pixel line from which to derive the value of the prediction pixel. As further described below, the location along the above peripheral pixel line can be a sub-pixel location. Thus, the value at that location of the peripheral pixel line can be derived from the above peripheral pixels (using interpolation, for example).

The technique 900 can be summarized as, for each row of the prediction block, resample (e.g., repeatedly look at, consider, etc.) the set of above peripheral pixels (e.g., i.e., positions of the peripheral pixels) while, at each resampling, shifting the positions according to one or more parameters of the intra-prediction mode.

The locations can then be used to generate (e.g., calculate, etc.) the prediction block for the current block. When the technique 900 is implemented by an encoder, the prediction block can be used to determine a residual block, which is then encoded in a compressed bitstream, such as the compressed bitstream 420 of FIG. 4. When the technique 900 is implemented by a decoder, the prediction block can be to reconstruct the current block by, for example, adding the prediction block to a residual block that is decoded from a compressed bitstream, such as the compressed bitstream 420 of FIG. 5.

The peripheral pixel line can include above peripheral pixels (e.g., the pixels A-D, or the pixels A-D and M of FIG. 7). The peripheral pixel M of FIG. 7 can be considered to be part of the above pixels, part of the left pixels, or can be referenced separately. In an example, the above peripheral pixels can include additional pixels (referred to herein as overhang above pixels), such as the peripheral pixels E-H of FIG. 7 and FIG. 15. It is noted that no overhang left pixels are shown in FIG. 7.

The positions calculated by the technique 900 can be relative to a one dimensional array that includes the peripheral pixels. For example, assume that the peripheral pixels available for predicting the current block are pixels A-H of FIG. 7. The pixel values A-H can be stored in an array periph_pixels, such as periph_pixels=[0, 0, A, B, C, D, E, F, G, H]. An explanation as to why the first two positions of the periph_pixels array are 0 is provided below.

In an example, the technique 900 may calculate negative positions corresponding to pixel locations outside of the block. Negative positions correspond to locations that are to the left of the block. In an example, pixel values that are too far away from the current pixel are not used as predictors for the pixel; instead a closer pixel can be used for prediction. In the case of a negative pixel location, that pixels from the other border (e.g., left peripheral pixels) may be determined to be closer (e.g., better predictors), as further described below.

As an implementation detail, the periph_pixels can account for such situations by including empty locations in the array periph_pixels. The periph_pixels array is shown as including two (2) empty locations (empty_slots). Thus, if the technique 900 determines a position (e.g., calculated_position) of zero (0), that position corresponds to the pixel value A (e.g., periph_pixels[empty_slots+calculated_position]=periph_pixels[2+0]=A). Similarly, if the technique 900 calculates a position of −2, then that corresponds to the pixel value periph_pixels[2+(−2)]=[0]=0. Similarly, the periph_pixels array can include training empty slots.

In an example, the technique 900 can receive as input, or can have access to one or more parameters of the intra-prediction mode. The technique 900 can receive the size and width of the current block (or, equivalently, the size and width of the prediction block). The technique 900 can also receive one or more of the parameters: a horizontal offset (h_off), a horizontal step (h_st), a horizontal acceleration (h_acc), a vertical offset (v_off), a vertical a step (v_st), and a vertical acceleration (v_acc). In an example, not receiving a parameter can be equivalent to receiving a zero value of the parameter. While the parameters are described below as being additive quantities, in some examples, at least some of the parameters can equivalently be multiplicative values.

The horizontal offset (h_off) parameter is an offset (i.e., a location offset) that is used for each single vertical pixel step. The horizontal offset (h_off) can answer the question: for a new row (e.g., row=k) of the prediction block, where, along the peripheral pixel line, is the pixel position from which to derive the value of the first pixel of the new row compared to (e.g., relative to) the position of the first pixel of the previous row (e.g., row=k−1)? The horizontal offset can be indicative of an initial prediction angle. By initial prediction angle is meant an angle of predicting the first pixels of each row of the prediction block.

The horizontal step (h_st) parameter is an offset that can be used for the next pixel horizontally. That is, for a given prediction pixel on a row of the prediction block, the horizontal step (h_st) indicates the distance to a next position along the peripheral pixel line relative to the position for the immediately preceding pixel on the same row. A horizontal step (h_st) that is less than 1 (e.g., 0.95, 0.8, etc.) can implement a zooming out in the prediction block. For example, using a horizontal step (h_st) that is less than 1, the railroads of FIG. 8 would be moving away from each other in the prediction block. Similarly, using a horizontal step (h_st) that is greater than 1 (e.g., 1.05, 1.2, etc.) can implement a zooming in effect in the prediction block.

The horizontal acceleration (h_acc) parameter is the change to the added to each subsequent horizontal step (h_st). Instead of stepping along the peripheral pixel line from a position to the next at a constant horizontal step, the horizontal acceleration (h_acc) parameter can be used as a shift to consistently move positions further and further apart. As such, the horizontal acceleration enables transformations similar to an homographic transformation.

The vertical offset (v_off) parameter is the change to be applied to the horizontal offset (h_off) for each subsequent row. That is, if h_off is used for the first row of the prediction block, then (h_off+v_off) is used for the second row, ((h_off+v_off)+v_off) is used for the third row, and so on. The vertical step (v_st) parameter is the change to be applied to the horizontal step (h_st) for each subsequent row of the prediction block. The vertical acceleration (v_acc) parameter is the change to be applied to the horizontal acceleration (h_acc) for each subsequent row of the prediction block.

It is noted that acceleration in both at least one of the directions (i.e., the horizontal acceleration (h_acc) parameter and/or the vertical acceleration (v_acc) parameter) enable the prediction of curves. That is, the accelerations parameters can enable curved predictions.

At 902, the technique 900 initializes variables. A variable h_step_start can be initialized to the horizontal step parameter: h_step_start=h_st. A variable h_offset and a variable h_start can each be initialized to the horizontal offset: h_offset=h_off and h_start=h_off.

At 904, the technique 900 initializes an outer loop variable i. The technique 900 performs 908-920 for each row of the prediction block. At 906, the technique 900 determines whether there are more rows of the prediction block. If there are more rows, the technique 900 proceeds to 908; otherwise the technique 900 ends at 922. When the technique 900 ends at 922, each pixel location of the prediction location has a respective location along the peripheral pixel line from which a pixel value for the each pixel location is calculated (e.g., derived, etc.) in the POSITIONS 2-dimensional array.

At 908, the technique 900 sets a position variable, p, to the variable h_start (i.e., p=h_start); and a variable h_step to the variable h_step_start (i.e., h_step=h_step_start).

At 910, the technique 900 initializes an inner loop variable j. The technique 900 performs 914-918 for each pixel of the row i of the prediction block. At 912, the technique 900 determines whether there are more pixel locations of the row (i.e., more columns) If there are more columns, the technique 900 proceeds to 914; otherwise the technique 900 proceeds to 920 to reset (i.e., update) variables for the next row of the prediction block, if any.

At 914, the techniques 900 sets the location (i, j) of the POSITIONS array to the value of the position variable, p, (i.e., POSITIONS(i, j)=p). At 916, the technique 900 advances the position variable, p, to the next horizontal position by adding h_step to the position variable, p (i.e., p=h_step+p). At 918, the technique 900 prepares the variable h_step for the next column of the row i of the prediction block, in case there any more unprocessed columns. As such, the technique 900 adds the horizontal acceleration (h_acc) to the variable h_step (i.e., h_step=h_acc+h_step). From the 918, the technique 900 proceeds back to 912.

At 920, the technique 900 prepares (i.e., updates) the variables of the technique 900 in preparation for the next row of the prediction block, if any. Thus, for the next row (i.e., row=i+1), the technique 900 updates h_start to h_start=h_offset+h_start; adds the vertical offset (v_off) to h_offset (i.e., h_offset=v_off+h_offset), adds the vertical step (v_st) to h_step_start (i.e., h_step_start=v_st+h_step_start), and adds the vertical acceleration (v_acc) to h_acc (i.e., h_acc=v_acc+h_acc).

FIG. 10 is an example 1000 of positions (i.e., the array POSITIONS) calculated by the technique of FIG. 9 according to implementations of this disclosure. The example 1000 is generated for the inputs: a current block size of 8×8, a horizontal offset h_off=−0.2, a horizontal step h_st=1.05, a horizontal acceleration h_acc=0, a vertical offset v_off=0, a vertical a step v_st=0.06, and a vertical acceleration v_acc=0. The example 1000 illustrates values of the 2-dimensional array POSITIONS described above.

The example 1000 illustrates for each location (i, j), where i=0, . . . , columns−1, j=0, . . . , rows−1, of the prediction block, the position of the peripheral pixel line from which the prediction value for the location (i, j) should be derived. Predictor locations 1002-1008 illustrate examples of the position values of the example 1000. The predictor location 1002 corresponding to the location (3, 1) of the prediction block is to derive its prediction value from position 2.93 of the peripheral pixel line. The predictor location 1004 corresponding to the location (6, 4) of the prediction block is to derive its prediction value from position 6.74 of the peripheral pixel line. The predictor location 1006 corresponding to the location (0, 1) of the prediction block is to derive its prediction value from position −0.4 of the peripheral pixel line. The predictor location 1008 corresponding to the location (0, 6) of the prediction block is to derive its prediction value from position −1.4 of the peripheral pixel line.

FIG. 11 is an example 1100 of a prediction block that is calculated from the example 1000 of FIG. 10. The example 1100 includes a prediction block 1102, which is visualized as a prediction block 1104. The prediction block 1102 (and, equivalently, the prediction block 1104) is derived (e.g., generated, calculated, etc.) using the positions of the example 1000 of FIG. 10 and peripheral prediction pixels 1106, which may be top (i.e., above) peripheral pixels. The peripheral prediction pixels 1106 can be, for example, the peripheral pixels A-H of FIG. 7. A peripheral prediction pixels 1108 is a visualization of the peripheral prediction pixels 1106.

In the visualization, a pixel value of zero (0) corresponds to a black square and a pixel of 255 corresponds to a while square. Pixel values between 0 and 255 correspond to different shades of grey colored squares. As such, luminance blocks are illustrated as examples of the intra-prediction modes according to this disclosure. However, the disclosure is not so limited. The disclosed techniques also apply to chrominance blocks or any other color component block. In general, the techniques disclosed herein apply to any prediction block to be generated, which may be of any size M×N, where M and N are positive integers.

As described above and illustrated in the example 1000 of FIG. 10, the positions calculated by the technique 900 of FIG. 9 can be non-integer positions (i.e., sub-pixel position) of the peripheral pixel line. The pixel values of the peripheral pixel line at non-integer positions are to be derived (e.g., calculated, etc.) from the available integer pixel position values (i.e., the peripheral pixels), such as the peripheral prediction pixels 1106.

Many techniques can be available for calculating the sub-pixel positions (i.e., pixel values at the sub-pixel positions). For example, a multi-tap (e.g., 4 tap, 6 tap, etc.) finite impulse response (FIR) filter can be used. For example, an average of surrounding pixels can be used. For example, bilinear interpolation can be used. For example, a 4-pixel bicubic interpolation of the peripheral pixels (e.g., the top row or the left column) can be used. For example, a convolution operation can be used. The convolution operation can use pixels other than the peripheral pixels. In an example, a convolution kernel of size N×N may be used. Thus, N rows (columns) of the above (left) neighboring block can be used. To illustrate, a 4-tap filter, or a 4×1 convolution kernel, with weights (−0.1, 0.6, 0.6, −0.1) can be used. Thus calculating a pixel value at a position between pixel1 and pixel2 of the set of four pixels (pixel0, pixel1, pixel2, pixel3) can be calculated as clamp (−0.10*pixel0+ 0.6*pixel1+0.6*pixel2−0.10*pixel3, 0, 255) where the clamp( ) operation sets to zero a calculated value that is less than zero and sets to 255 a calculated value that is greater than 255.

The prediction block 1102 illustrates using bilinear interpolation. For a sub-pixel position of the peripheral pixel line, the closest two integer pixels are found. The predictor value is calculated as the weighted sum of the closest two integer pixels. The weights are determined according to the distances of the sub-pixel position to the two integer pixels positions.

Given a position, pos, of the peripheral pixel line, the pixel value pix_val at pos can be calculated as pix_val=left_weight× left_pixel+right_weight× right_pixel. Left_pixel is the pixel value of nearest left neighboring integer pixel of the position pos. Right_pixel is the pixel value of nearest right neighboring integer pixel of the position pos.

The position of left_pixel can be calculated as left_pos=floor(pos), where floor( ) is a function that returns the largest integer that is smaller than or equal to pos. Thus, floor(6.74)=6. The position 6.74 is the position for the predictor location 1004 of FIG. 10. The position of right_pixel can be calculated as right_pos=ceiling(pos), where ceiling( ) is a function that returns the smallest integer that is greater than or equal to pos. Thus, ceiling(6.74)=7.

In an example, right_weight can be calculated as right_weight=pos−left_pos and left_weight can be calculated as left_weight=1−right_weight. Thus, for the position 6.74 for the predictor location 1004, right_weight=6.74−6=0.74, and left_weight=1−0.74=0.26. Pixel value 1112 of the prediction block 1102 is the value that is derived from the predictor location 1004 of FIG. 10. As such, the pixel value 1112 is calculated as ((255×0.26)+(0×0.74))=66.

Similarly, a predictor value 1110 is the predictor pixel value calculated from the predictor location 1006 (i.e., −0.4) of FIG. 10. Thus left_pos and right_pos are −1 and 0, respectively. The right_weight and the left_weight are, respectively, 0.6 and 0.4. The right neighboring pixel value is the peripheral pixel value of peripheral prediction pixels 1106 at location 0. Thus, the right neighboring pixel value is a pixel 1114, which has the value of 0. The left neighboring pixel is not available. Thus, the left neighboring pixel value is 0. As such, the predictor value 1110 is calculated as ((0×0.4)+(0×0.6))=0.

How the parameters (i.e., the parameter values) of the intra-prediction mode are used is discussed above with respect to FIGS. 10-11. There are any number of ways for selecting the parameter values.

In an example, a mode selection process of an encoder can test all possible parameter values to find the optimal combination of parameter values that results in the smallest residual. In an example, the smallest residual can be one that results in the best rate-distortion value. In an example, the smallest residual can be one that results in the smallest residual error. The smallest residual error can be a mean square error. The smallest residual error can be a sum of absolute differences error. Any other suitable error measure can be used. The encoder can encode, in addition to an indication of the intra-prediction mode itself, the parameter values of the optimal combination of parameter values in an encoded bitstream. A decoder can decode the parameter values of the optimal combination of parameter values. In an example, the indication of the intra-prediction mode itself can be a number (e.g., an integer) that instructs the decoder to perform an intra-prediction of a current block using the intra-prediction parameters, as described herein.

Testing all possible values for each parameter may be an impractical solution. As such, a finite number of values for each parameter can be selected and the combinations of the finite number of values tested.

For example, the horizontal offset (h_off) parameter can be selected from a limited range of values. In an example, the limited range of values can be [−4, +4]. A step value can be used to select horizontal offset (h_off) parameter values within the limited range to test. In an example, the step can be 0.25 (or some other value). As such, the values −4, −3.75, −3.5, −3.25, . . . , 3.75, 4 can be tested. In an example, the vertical offset (v_off) parameter can be selected similarly to the horizontal offset parameter.

With respect to the horizontal step (h_st) and the vertical step (v_st), values relatively close to 1 can be selected. Any other values can result in too fast of a zoom in the prediction block. Thus, values in the range of [0.9, 1.1] can be tested for the horizontal step (h_st) and the vertical step (v_st). However, in general, the horizontal step (h_st) and the vertical step (v_st) can each be selected from a range of [−4, 4] using a step value, which can be 0.25. The selected horizontal acceleration (h_acc) and vertical acceleration (v_acc) parameter values can be close to 0. In an example, the horizontal acceleration (h_acc) and vertical acceleration (v_acc) parameter values can each be 0 or 1. More generally, the horizontal parameters and the counterpart vertical parameters can be have the values and/or ranges of values.

In another example, the encoder can select the parameter values based on a likely best set of parameter values. The likely best set of parameter values are also referred to herein as predicted parameter values. The likely best set of parameter values can be derived by predicting the peripheral pixels from their neighboring pixels. That is, in the case of above peripheral pixels, the peripheral pixels constitute the bottom-most row(s) of previously reconstructed block(s); and in the case of left peripheral pixels, the peripheral pixels constitute the right-most column(s) of previously reconstructed block(s). Thus, the neighboring row, column, or both (as the case may be) of the peripheral pixels can be used as predictors of the peripheral pixels. As the predictors of the peripheral pixels and the peripheral pixels themselves are known, the parameter values can be derived from them. In this case, the encoder need not encode the likely best set of parameter values in the compressed bitstream because the decoder can perform the exact similar process as that of the encoder to derive the likely best set of parameter values. Thus all that the encoder needs to encode in the bitstream is an indication of the intra-prediction mode itself.

In another example, differential parameter values can be encoded by the encoder. For example, the encoder can derive the optimal parameter values, as described above, and can derive the likely best set of parameter values (i.e., the predicted parameter values), as also described above. The encoder then encode, in addition to the indication of the intra-prediction mode, the respective differences between the optimal parameter values and the likely best set of parameter values. That is, for example, with respect to the horizontal offset (h_off), the encoder can derive an optimal horizontal offset (opt_h_off) and a likely best horizontal offset (predicted_h_offset). The encoder then encoder the difference (opt_h_off−predicted_h_offset).

Figure 12:
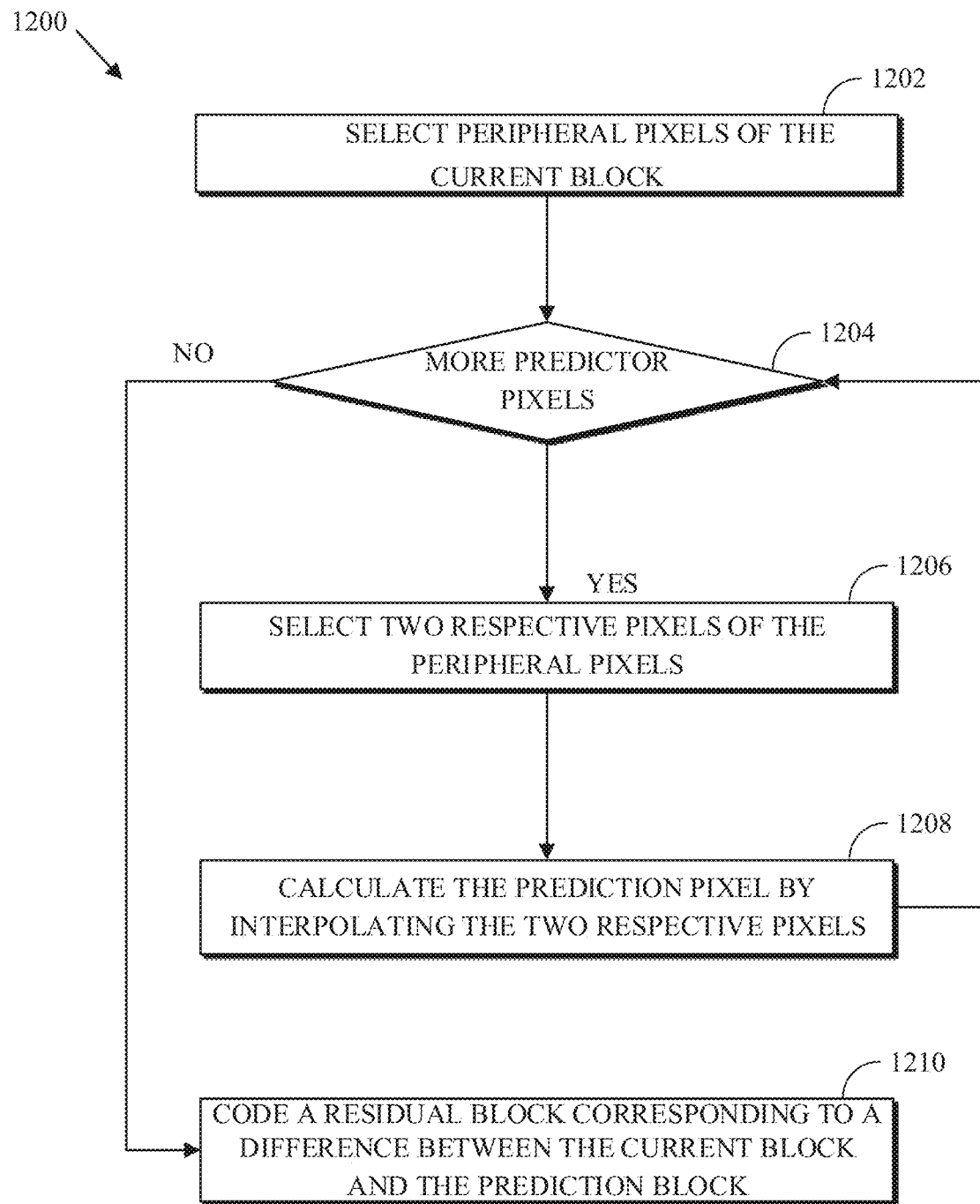
FIG. 12 is a flowchart diagram of a technique for intra-prediction of a current block according to an implementation of this disclosure.

FIG. 12 is a flowchart diagram of a technique 1200 for intra-prediction of a current block according to an implementation of this disclosure. The intra prediction mode uses pixels peripheral to the current block. The pixels peripheral to the current block can be previously predicted pixels in the same video frame or image as the current block. The current block can be a luminance block, a chrominance block, or any other color-component block. The current block can be of size M×N, where M and N are positive integers. In an example, M is equal to N. In an example, M is not equal to N. For example, the current block can be of size 4×4, 4×8, 8×4, 8×8, 16×16, or any other current block size. The technique 1200 generates a prediction block for the current block that is of the same size as the current block. The technique 1200 can be implemented in an encoder such as the encoder 400 of FIG. 4. The technique 1200 can be implemented in a decoder such as the decoder 500 of FIG. 5.

The technique 1200 can be implemented, for example, as a software program that can be executed by computing devices such as the transmitting station 102 or the receiving station 106. The software program can include machine-readable instructions that can be stored in a memory such as the memory 204 or the secondary storage 214, and that can be executed by a processor, such as CPU 202, to cause the computing device to perform the technique 1200. In at least some implementations, the technique 1200 can be performed in whole or in part by the intra/inter prediction stage 402 of the encoder 400 of FIG. 4. In other implementations, the technique 1200 can be performed in whole or in part by the intra/inter-prediction stage 508 of the decoder 500 of FIG. 5.

The technique 1200 can be implemented using specialized hardware or firmware. Some computing devices can have multiple memories, multiple processors, or both. The steps or operations of the technique 1200 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

At 1202, the technique 1200 selects peripheral pixels of the current block. The peripheral pixels are used to generate a prediction block for the current block. In an example, the peripheral pixels can be pixels above the current block. In an example, the peripheral pixels can be pixels to the left of the current block. In an example, the peripheral pixels can be a combination of above and left pixels of the current block. When implemented by a decoder, selecting the peripheral pixels can include reading (e.g., decoding) from a compressed bitstream an indication (e.g., a syntax element) indicating which peripheral pixels are to be used.

For each location (i.e., pixel location) of the prediction block, the technique 1200 performs 1206-1208. Thus, if the current block is of size M×N, then the prediction block can include M*N pixel locations. As such, at 1204, the technique 1200 determines whether there are more pixel locations of the prediction block for which 1206-1208 have not been performed yet. If there are more pixel locations, then the technique 1200 proceeds to 1206; otherwise, the technique 1200 proceeds to 1210.

At 1206, the technique 1200 selects, for a pixel location of the prediction block, two respective pixels of the peripheral pixels. In an example, the technique 1200 first selects a position along a continuous peripheral pixel line along which the peripheral pixels are integer pixel locations. At 1208, the technique 1200 calculates, for the pixel location of the prediction block, the prediction pixel (i.e., a pixel value) by interpolating the two respective pixels.

In an example, selecting the position along the continuous peripheral pixel line can be as described with respect to FIG. 9. Thus, selecting the two respective pixels of the peripheral pixels can include selecting first two respective pixels of the peripheral pixels for calculating a first prediction pixel of the prediction block and selecting second two respective pixels of the peripheral pixels for calculating a second prediction pixel of the prediction block.

The second prediction pixel can be a horizontally (or vertically) neighboring pixel of the first prediction pixel. That is, the second prediction pixel can be in the same row (or column) as the first prediction pixel. In an example, the first prediction pixel can be adjacent to the second prediction pixel in the same row (or column). The first two respective pixels and the second two respective pixels can be selected according to intra-prediction mode parameters.

As described above, the intra-prediction mode parameters can include at least two of a horizontal offset, a horizontal step, or a horizontal acceleration. In an example, the intra-prediction mode parameters can include the horizontal offset, the horizontal step, and the horizontal acceleration. As described above, the horizontal offset can be indicative of an initial prediction angle; the horizontal step can be used as a subsequent offset for subsequent prediction pixels of a same row; and the horizontal acceleration can be indicative of a change to the horizontal offset that is added to each subsequent horizontal step. As described above, the horizontal step indicates an initial pixel position, along a line of the peripheral pixels, from which to derive a respective value of a first pixel of a new row k as compared to a position of a first pixel of a previous row k−1.

In an example, the horizontal offset can be selected from a limited range based on a step value. In an example, the limited range can be −4 to 4. In an example, the step value can be 0.25. In an example, the horizontal (vertical) step can be selected from a range of −4 to 4 based on a step value. The step value can be 0.25 or some other value. In an example, the horizontal (vertical) acceleration can be 0. In another example, the horizontal (vertical) acceleration can be 1.

As further described above, the intra-prediction mode parameters can also include at least two of a vertical offset, a vertical step, or a vertical acceleration. In an example, the intra-prediction mode parameters can include the vertical offset, the vertical step, and the vertical acceleration. The vertical offset can be indicative of a first change to the horizontal offset to be applied to each subsequent row of the prediction block. The vertical step can be indicative of a second change to the horizontal step to be applied to the each subsequent row of the prediction block. The vertical acceleration can be indicative of a third change to the horizontal acceleration to be applied to the each subsequent row of the prediction block.

In an example, calculating the prediction pixel by interpolating the two respective pixels can include calculating the prediction pixel using bilinear interpolation.

At 1210, the technique 1200 codes a residual block corresponding to a difference between the current block and the prediction block. When implemented by an encoder, the technique 1200 encodes the residual blocks in a compressed bitstream. When implemented by a decoder, the technique 1200 decodes the residual block from the compressed bitstream. The decoded residual block can be added to prediction block to reconstitute the current block.

When implemented by a decoder, the technique 1200 can also include decoding the intra-prediction mode parameters from a compressed bitstream. In another example, and described above, the intra-prediction mode parameters can be derived by predicting, according to the intra-prediction mode parameters, the peripheral pixels from other pixels of a previously reconstructed block that includes the peripheral pixels.

Figure 13:
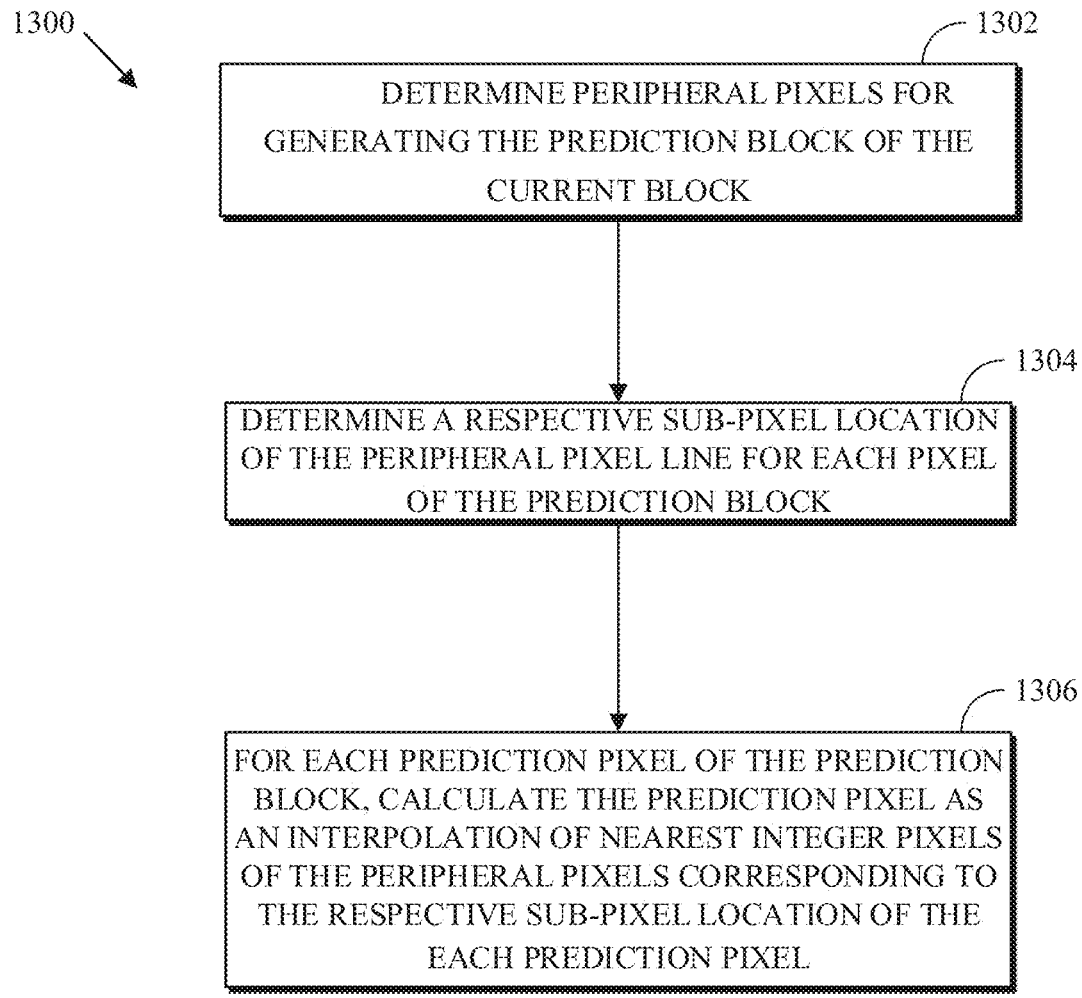
FIG. 13 is a flowchart diagram of a technique of generating a prediction block for a current block using intra-prediction according to an implementation of this disclosure.

FIG. 13 is a flowchart diagram of a technique 1300 of generating a prediction block for a current block using intra-prediction according to an implementation of this disclosure. The intra prediction mode uses pixels peripheral to the current block, which can be as described with respect to the technique 1200 of FIG. 12. The current block can be as described with respect to the technique 1200 of FIG. 12. The technique 1300 can be implemented in an encoder such as the encoder 400 of FIG. 4. The technique 1300 can be implemented in a decoder such as the decoder 500 of FIG. 5.

The technique 1300 can be implemented, for example, as a software program that can be executed by computing devices such as the transmitting station 102 or the receiving station 106. The software program can include machine-readable instructions that can be stored in a memory such as the memory 204 or the secondary storage 214, and that can be executed by a processor, such as CPU 202, to cause the computing device to perform the technique 1300. In at least some implementations, the technique 1300 can be performed in whole or in part by the intra/inter prediction stage 402 of the encoder 400 of FIG. 4. In other implementations, the technique 1300 can be performed in whole or in part by the intra/inter-prediction stage 508 of the decoder 500 of FIG. 5.

The technique 1300 can be implemented using specialized hardware or firmware. Some computing devices can have multiple memories, multiple processors, or both. The steps or operations of the technique 1300 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

At 1302, the technique 1300 determines peripheral pixels for generating the prediction block of the current block. Determining the peripheral pixels can mean selecting which of the peripheral pixels to use, such as described with respect to 1202 of FIG. 12. The peripheral pixels can be thought of as being integer pixel locations along a peripheral pixel line (i.e., a continuous line of peripheral pixels).

At 1304, the technique 1300 determines a respective sub-pixel location of the peripheral pixel line for each pixel of the prediction block. Determining the respective sub-pixel location can be as described with respect to FIG. 9. A sub-pixel location of the peripheral pixel line as used herein also encompasses integer pixel locations. That is, for example, a sub-pixel location that is determined can be the location of one of the peripheral pixels themselves.

At 1306, for each prediction pixel of the prediction block, the technique 1300 calculates the prediction pixel as an interpolation of integer pixels of the peripheral pixels corresponding to the respective sub-pixel location of the each prediction pixel. In an example, the interpolation can be an interpolation of nearest integer pixels, as described above with respect to FIG. 11. In an example, bilinear interpolation can be used. In another example, filtering of the integer pixels can be performed to obtain a prediction pixel of the prediction block.

In an example, determining the respective sub-pixel location of the peripheral pixels for each pixel of the prediction block can include, for each row pixel of a first row of the prediction block, determining the respective sub-pixel location using parameters comprising at least two of a horizontal offset, a horizontal step, or a horizontal acceleration. As described above, the horizontal offset can be indicative of an initial prediction angle. As described above, the horizontal step can be used as a subsequent offset for subsequent prediction pixels of a same row. As described above, the horizontal acceleration can be indicative of a change to the horizontal offset that is added to each subsequent horizontal step.

In an example, determining the respective sub-pixel location of the peripheral pixels for each pixel of the prediction block can include determining the respective sub-pixel location of each pixel of a second row of the prediction block, where the parameters further include at least two of a vertical offset, a vertical step, or a vertical acceleration. As described above, the vertical offset can be indicative of a first change to the horizontal offset to be applied to each subsequent row of the prediction block. As described above, the vertical step can be indicative of a second change to the horizontal step to be applied to the each subsequent row of the prediction block. As described above, the vertical acceleration can be indicative of a third change to the horizontal acceleration to be applied to each subsequent row of the prediction block.

In an example, and when implemented by a decoder, the technique 1300 can include decoding the parameters from a compressed bitstream. In an example, decoding the parameters from the compressed bitstream can include, as described above, decoding parameter differences; deriving predicted parameter values; and for each parameter, adding a respective parameter difference to a respective predicted parameter value.

As mentioned above, in an embodiment, a directional prediction mode can be used to generate an initial prediction block. A warp (e.g., a warping function, a set of warping parameters, parameters, etc.) can then be applied of the initial prediction block to generate the prediction block.

In an example, the parameters of the warp can be derived using the current block and the initial prediction block. Any number of techniques can be used to derive the parameters of the warp. For example, a Random Sample Consensus (RANSAC) method can be used to fit a model (i.e., a warp model, parameters) to matched points between the current block and the initial prediction block. RANSAC is an iterative algorithm that can be used to estimate warp parameters (i.e., the parameters) between two blocks. In an example, the best matching pixels between the current block and the initial prediction block can be used to derive the parameters of the warp. The warp can be a homographic warp, an affine warp, a similarity warp, or some other warp.

A homographic warp can use eight parameters to project some pixels of the current block to some pixels of the initial prediction block. A homographic warp is not bound by a linear transformation between the coordinates of two spaces. As such, the eight parameters that define a homographic warp can be used to project pixels of the current block to a quadrilateral portion of the initial prediction block. Homographic warps thus support translation, rotation, scaling, changes in aspect ratio, shearing, and other non-parallelogram warping.

An affine warp uses six parameters to project pixels of the current block to some pixels of the initial prediction block. An affine warp is a linear transformation between the coordinates of two spaces defined by the six parameters. As such, the six parameters that define an affine warp can be used to project pixels of the current block to a parallelogram that is part of the initial prediction block. Affine warps thus support translation, rotation, scale, changes in aspect ratio, and shearing.

A similarity warp uses four parameters to project pixels of the current block to pixels of the initial prediction block. A similarity warp is a linear transformation between the coordinates of two spaces defined by the four parameters. For example, the four parameters can be a translation along the x-axis, a translation along the y-axis, a rotation value, and a zoom value. As such, the four parameters that define a similarity model can be used to project pixels of the current block to a square of the initial prediction block. Similarity warps thus support square-to-square transformation with rotation and zoom.

In an example, the parameters of the warp can be transmitted, in addition to the directional intra prediction mode, in a compressed bitstream, from an encoder to a decoder. The decoder can use the directional intra prediction mode to generate an initial prediction block. The decoder can then use the parameters to the transmitted parameters to decode a current block.

In another example, the parameters can be derived, by the decoder. For example, the decoder can use prior decoded pixels, as described above, to determine the parameters of the warp. For example, as mentioned above, pixels of the same block as the peripheral pixels can be used to predict the peripheral pixels thereby determining the warp parameters. That is, as the peripheral pixels are already known, best warp parameters can be determined for predicting the peripheral pixels from their neighboring pixels.

In another example, differential warp parameters can be transmitted by the encoder, as described above. For example predicted warp parameters can be derived using the neighboring pixels of the peripheral parameters and optimal warp parameters are derived as described above. The differences between the optimal warp parameters and the predicted warp parameters can be transmitted in the compressed bitstream.

Described above, at least with respect to FIGS. 9-11, is a case where only the above peripheral pixels are used. For example, only the above peripheral pixels can be used in a case where other peripheral pixels (e.g., the left peripheral pixel) are not available. For example, only the above peripheral pixels can be used even when the left peripheral pixels are available.

Using the left peripheral pixels can be similar to using the above peripheral pixels. In an example, only the left peripheral pixels can be used in a case where the above peripheral pixel are not available. In another example, only the left peripheral pixels can be used even when the above peripheral pixels are available.

Figure 18:
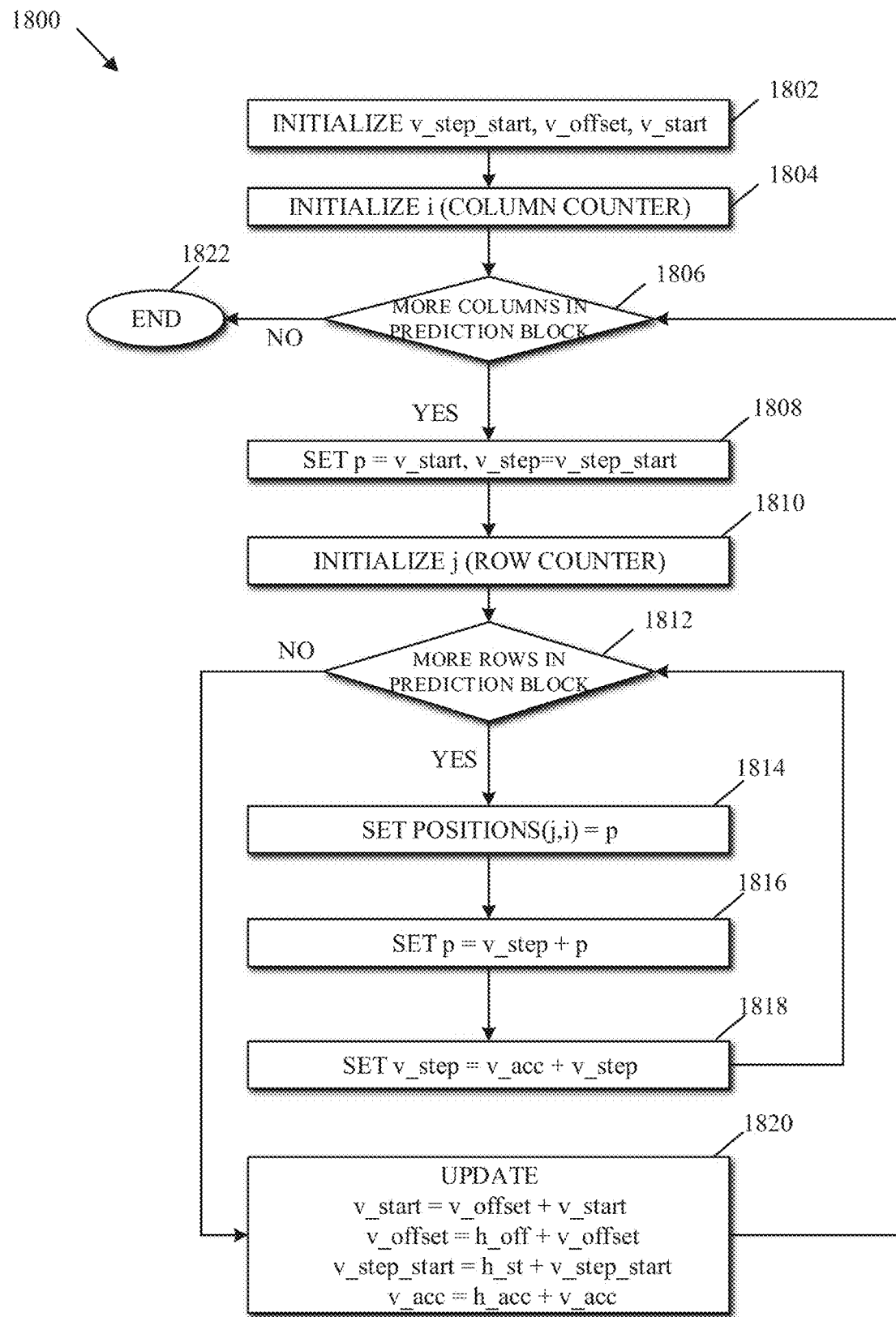
FIG. 18 is an example of a flowchart of a technique for determining positions along a peripheral pixel line for determining prediction pixel values according to an implementation of this disclosure.

FIG. 18 is an example of a flowchart of a technique 1800 for determining positions along a left peripheral pixel line for determining prediction pixel values according to an implementation of this disclosure. For a prediction block (or, equivalently, a current block) of size M×N, the technique 1800 calculates a block (e.g., a 2-dimensional array) of size M×N. The 2-dimensional array is referred to below as the array POSITIONS.

Given a current block and a set of left peripheral pixels (i.e., at integer peripheral pixel locations), the technique 1800 determines, for each prediction pixel (i.e., or equivalently, each prediction pixel location) of the prediction block, a location along the left peripheral pixel line from which to derive the value of the prediction pixel. As further described below, the location along the left peripheral pixel line can be a sub-pixel location. Thus, the value at that location of the left peripheral pixel line can be derived from the left peripheral pixels (using interpolation, for example).

The technique 1800 can be summarized as, for each column of the prediction block, resample (e.g., repeatedly look at, consider, etc.) the set of left peripheral pixels (e.g., i.e., positions of the left peripheral pixels) while, at each resampling, shifting the positions according to one or more parameters of the intra-prediction mode. The locations can then be used to generate (e.g., calculate, etc.) the prediction block for the current block.

A detailed description of the technique 1800 is omitted as the technique 1800 is very similar to the technique 900. In the technique 1800, the roles (i.e., the use) of the horizontal offset (h_off), the horizontal step (h_st), the horizontal acceleration (h_acc), the vertical offset (v_off), the vertical a step (v_st), and the vertical acceleration (v_acc) are the reverse of their role in the technique 900. That is, wherever a horizontal-related parameter is used in the process 900, the corresponding vertical parameter is used instead in the process 1800, and vice versa. Thus, 1802-1822 can be similar to 902-922, respectively. It is also noted that while an outer iteration (at 906) of the technique 900 iterates over the rows of the prediction block and the inner iteration (at 912) iterates over the columns of the prediction block, in the technique 1800, the outer iteration (at 1906) iterates over the columns of the prediction block and the inner iteration (at 1812) iterates over the rows of the prediction block.

Figure 19:
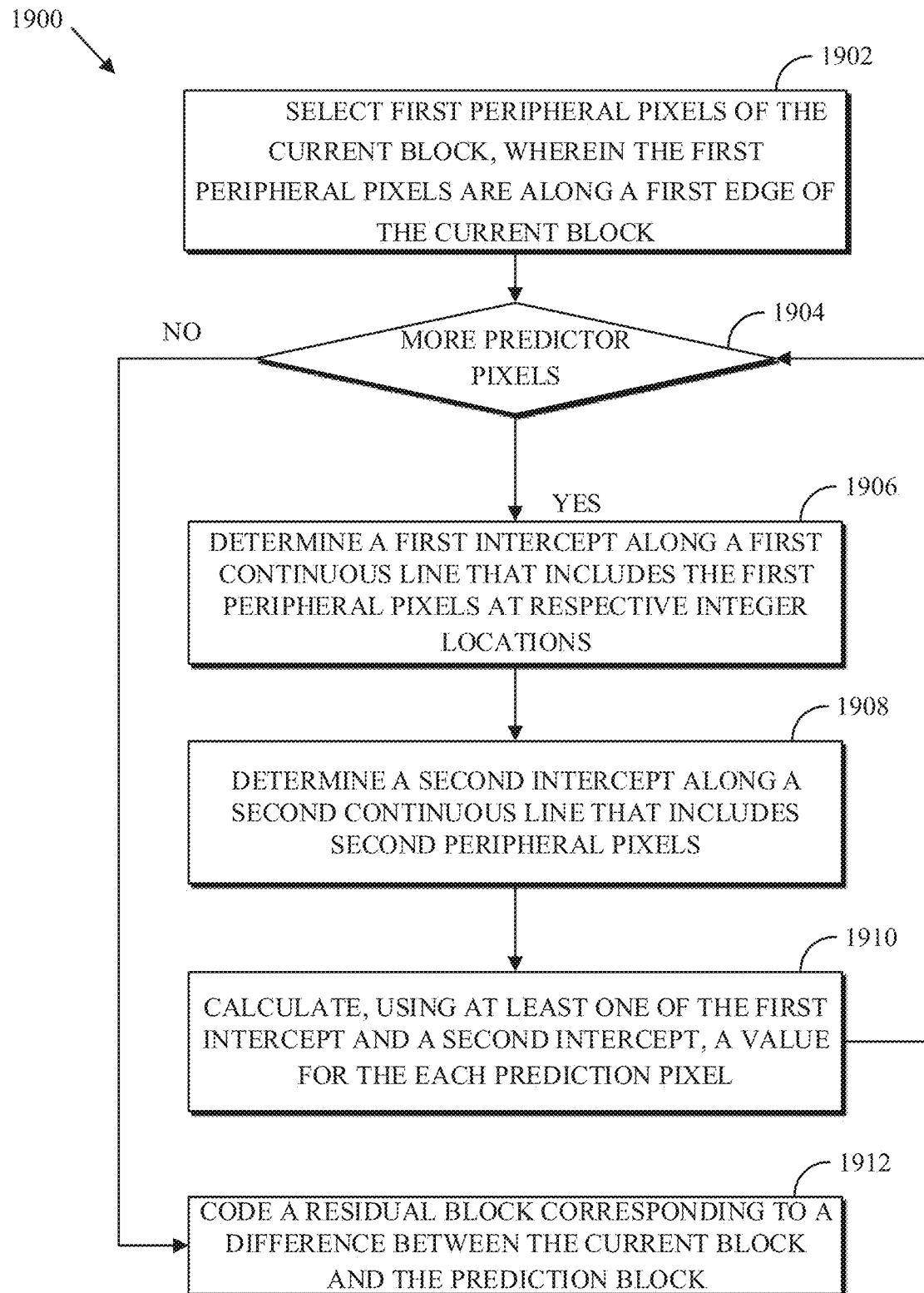
FIG. 19 is a flowchart diagram of a technique of generating a prediction block for a current block using intra-prediction according to an implementation of this disclosure.

FIG. 19 is a flowchart diagram of a technique 1900 of generating a prediction block for a current block using intra-prediction according to an implementation of this disclosure. The technique 1900 uses both above peripheral pixels and left peripheral pixels for generating the prediction block. The current block can be as described with respect to the technique 1200 of FIG. 12. The technique 1900 can be implemented in an encoder such as the encoder 400 of FIG. 4. The technique 1900 can be implemented in a decoder such as the decoder 500 of FIG. 5.

The technique 1900 can be implemented, for example, as a software program that can be executed by computing devices such as the transmitting station 102 or the receiving station 106. The software program can include machine-readable instructions that can be stored in a memory such as the memory 204 or the secondary storage 214, and that can be executed by a processor, such as CPU 202, to cause the computing device to perform the technique 1900. In at least some implementations, the technique 1900 can be performed in whole or in part by the intra/inter prediction stage 402 of the encoder 400 of FIG. 4. In other implementations, the technique 1900 can be performed in whole or in part by the intra/inter-prediction stage 508 of the decoder 500 of FIG. 5.

The technique 1900 can be implemented using specialized hardware or firmware. Some computing devices can have multiple memories, multiple processors, or both. The steps or operations of the technique 1900 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The technique 1900 is illustrated with reference to FIGS. 20A-20B. The FIGS. 20A-20B are illustrated with the following inputs: a current block size of 8×8, a horizontal offset h_off=0.25, a horizontal step h_st=1, a horizontal acceleration h_acc=1, a vertical offset v_off=4, a vertical a step v_st=1, and a vertical acceleration v_acc=0.

At 1902, the process 1900 selects first peripheral pixels of the current block. The first peripheral pixels are along a first edge of the current block. The first peripheral pixels are selected as primary pixels for generating the prediction block. In an example, the first peripheral pixels can be the above peripheral pixels. In an example, the first peripheral pixels can be the left peripheral pixels. Primary pixels, as further described below, are the pixels with respect to which positions along the first peripheral pixel line are calculated, as described with respect to either the technique 900 (in the case that the first peripheral pixels are the above peripheral pixels) or the technique 1800 (in the case that the first peripheral pixels are the left peripheral pixels).

When implemented by an encoder, the technique 1900 can be performed once using the top peripheral pixels as the first peripheral pixels and a second time using the left peripheral pixels are the first peripheral pixels. The encoder can test both to determine which provides the better prediction of the current block. In an example, the technique 1900 can transmit, in a compressed bitstream, such as the compressed bitstream 420 of FIG. 4, a first indication of which of the first peripheral pixels or the second peripheral pixels to use as the primary pixels for generating the prediction block. That is, for example, the first indication may be a bit value of 0 (1) when the above (left) peripheral pixels are used as the primary pixels. Other values of the first indication are possible.

Thus, when implemented by a decoder, the technique 1900 can select the first peripheral pixels by decoding from the compressed bitstream the first indication. In another example, the decoder can derive whether the first peripheral pixels are the above or the left peripheral pixels by predicting according to the techniques described herein the above row (left column) from its neighboring above rows (left columns).

For each location (i.e., pixel location) of the prediction block, the technique 1900 performs 1906-1910. Thus, if the current block is of size M×N, then the prediction block can include M*N pixel locations. As such, at 1904, the technique 1900 determines whether there are more pixel locations of the prediction block for which 1906-1910 have not been performed yet. If there are more pixel locations, then the technique 1900 proceeds to 1906; otherwise, the technique 1900 proceeds to 1910.

At 1906, the technique 1900 determines a first intercept along a first continuous line that includes the first peripheral pixels at respective integer locations. Thus, in the case that the first pixel positions are the above peripheral pixels, then the first intercept is a y-axis intercept; and, in the case that the first pixel positions are the left peripheral pixels, then the first intercept is a x-axis intercept.

FIG. 20A illustrates positions 2010 of values of the 2-dimensional array POSITIONS described above when the above peripheral pixels are used as the first peripheral pixels primary pixels. The positions 2010 can be calculated using the technique 900. Thus, the positions 2010 provide positions within the above peripheral row.

The example FIG. 20B illustrates positions 2050 of values of the 2-dimensional array POSITIONS when the left peripheral pixels are used as the first peripheral pixels primary pixels. The positions 2050 can be calculated using the technique 1800. Thus, the positions 2050 provide positions within the left peripheral column.

At 1908, the technique 1900 determines, using a location of the each prediction pixel and the first intercept, a second intercept along a second continuous line that includes second peripheral pixels. The second peripheral pixels are along a second edge of the current block that is perpendicular to the first edge.

In the case that the first prediction pixels are the above prediction pixels, then the second prediction pixels can be the left prediction pixels. In the case that the first prediction pixels are the left prediction pixels, then the second prediction pixels can be the above prediction pixels. Other combinations of first and second prediction pixels are also possible. For example the combinations right and above peripheral pixels, right and below peripheral pixels, or left and below peripheral pixels are possible.

In an example, the second intercept can be calculated by connecting a line between the prediction pixel location and the first intercept and extending the line toward the second continuous line.

Figure 16:
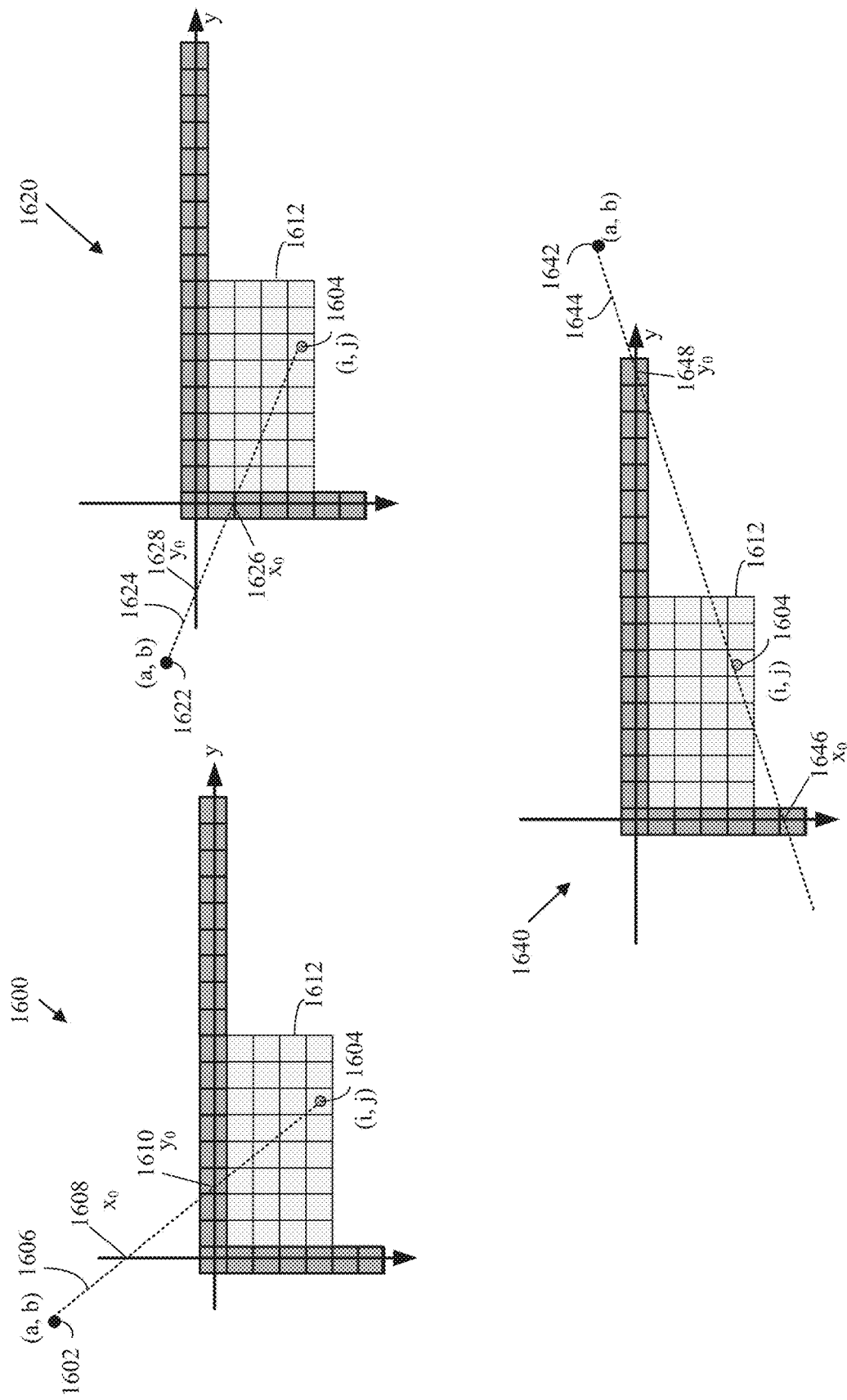
FIG. 16 are examples illustrating x- and y-intercepts according to implementations of this disclosure.

FIG. 16, which is described further below, is now used as an illustration. If a current prediction pixel is the prediction pixel 1604 and the first intercept is the y-intercept 1648, then the second intercept can be obtained by connecting the prediction pixel 1604 and the y-intercept 1648 and extending the line toward the x-axis. Thus, the second intercept is the x-intercept 1646. Similarly, if the current prediction pixel is the prediction pixel 1604 and the first intercept is the x-intercept 1646, then the second intercept can be obtained by connecting the prediction pixel 1604 and the x-intercept 1646 and extending the line toward the y-axis. Thus, the second intercept is the y-intercept 1648.

A block 2012 of FIG. 20A illustrates the x-intercepts when the first peripheral pixels are the above peripheral pixels. A block 2052 of FIG. 20B illustrates the y-intercepts when the first peripheral pixels are the left peripheral pixels. The intercepts can be calculated using one of the formulas of equation (1).

To illustrate, consider a prediction pixel 2010A at a location (1, 3) of the prediction. Thus, taking into account the top and left prediction pixels, the prediction pixel 2010A is at a location (2, 4) of a coordinate system having the origin where the top and the left peripheral pixels meet. The first intercept (i.e., the y-intercept) is at 7.5. Thus, a line can be formed by the two points (2, 4) and (0, 7.5). Thus, the x-intercept can be calculated as $(-7.5/((7.5-4)/(0-2)))=4.29$, as shown by an x-intercept value 2012A.

As another example, a prediction pixel 2050A at a location (1, 1) of the prediction block is at a position (2, 2) of the coordinate system that includes the top and left peripheral pixels. The first intercept (i.e., the x-intercept) is at 11. Thus, a line can be formed by the two points (2, 2) and (11, 0). Thus, the y-intercept can be calculated as $(-11*(0-2)/(11-2)=2.44$, as shown by an y-intercept value 2052A.

At 1910, the technique 1900 calculates, using at least one of the first intercept and the second intercept, a value for the each prediction pixel.

In an example, the value of the prediction pixel can be calculated as a weighted sum of the first intercept and the second intercept. More specifically, the value of the prediction pixel can be calculated as a weighted sum of a first pixel value at the first intercept and a second pixel value at the second intercept. The weights can be inversely proportional to distances from the location of the prediction pixel to each of the first intercept and the second intercept. As such, the value of the prediction pixel can be obtained as a bilinear interpolation of the first pixel value and the second pixel value. As is known, a distance between two points (a, b) and (c, d) can be calculated as $\sqrt{(a-c)^2+(b-d)^2}$.

In another example, instead of a weighted sum, the value of the prediction pixel can be calculated based on the nearest distance. That is, the one of the x-intercept and the y-intercept that is closer (based on the calculated distances) to the prediction pixel can be used for calculating the value of the prediction pixel.

Distances 2014 and 2016 of FIG. 20A illustrate the distances from each of the prediction pixel locations to the their respective y-intercepts and x-intercepts in the case where the first peripheral pixels are the left peripheral pixels. For example, for the prediction pixel at the location (2, 4) (i.e., the prediction pixel 2010A at the location (1, 3) of the prediction block) having a y-intercept of 7.5 (i.e., a point (0, 7.5), a distance 2014A is $\sqrt{(2-0)^2+(4-7.5)^2}=4.03$; and a distance 2016A to the x-intercept (4.29, 0) is given by $\sqrt{(2-4.29)^2+(4-0)^2}=4.61$. Similarly, distances 2054 and 2056 of FIG. 20B illustrate the distances from each of the prediction pixel locations to the their respective y-intercepts and x-intercepts in the case where the first peripheral pixels are the left peripheral pixels.

Thus, for the prediction pixel at the location (1, 4), in the case of using a weighted sum, the weight of the x-intercept and the y-intercept are, respectively, (4.61/(4.61+4.03)) =0.53, and (1−0.53)=0.47. The pixel value at each of the x-intercept and the y-intercept can be calculated as described above (e.g., as an interpolation of the two nearest integer pixel values).

In the case of using the nearest distance, the value of the prediction pixel at the location (1, 4) of the prediction block can be calculated using only the pixel value at the y-intercept since 4.03 (i.e., the distance 2014A) is smaller than 4.61 (i.e., the distance 2016A).

As described below with respect to FIG. 14, in some situations, the x-intercept or the y-intercept may not exit (e.g., are negative values). As also described with respect to FIG. 14, in such cases, the prediction value can be calculated only based on the available intercept value.

In an encoder, the technique 1900 can select one of the nearest distance, the weighted sum, or some other function to generate the prediction block. In an example, the technique 1900 can generate a respective prediction block for each the possible functions and select the one of the prediction blocks that produces the most optimal prediction. As such, the technique 1900 can encode in the compressed bitstream a second indication of the selected function to combine the first peripheral pixels and the second peripheral pixels to obtain the prediction block. As described, the function can be weighted sum, the nearest distance, or some other function.

When implemented by a decoder, the technique 1900 receives in the compressed bitstream, the second indication of the function to combine the first peripheral pixels and the second peripheral pixels to obtain the prediction block. The decoder uses to function to generate the prediction block.

Figure 21:
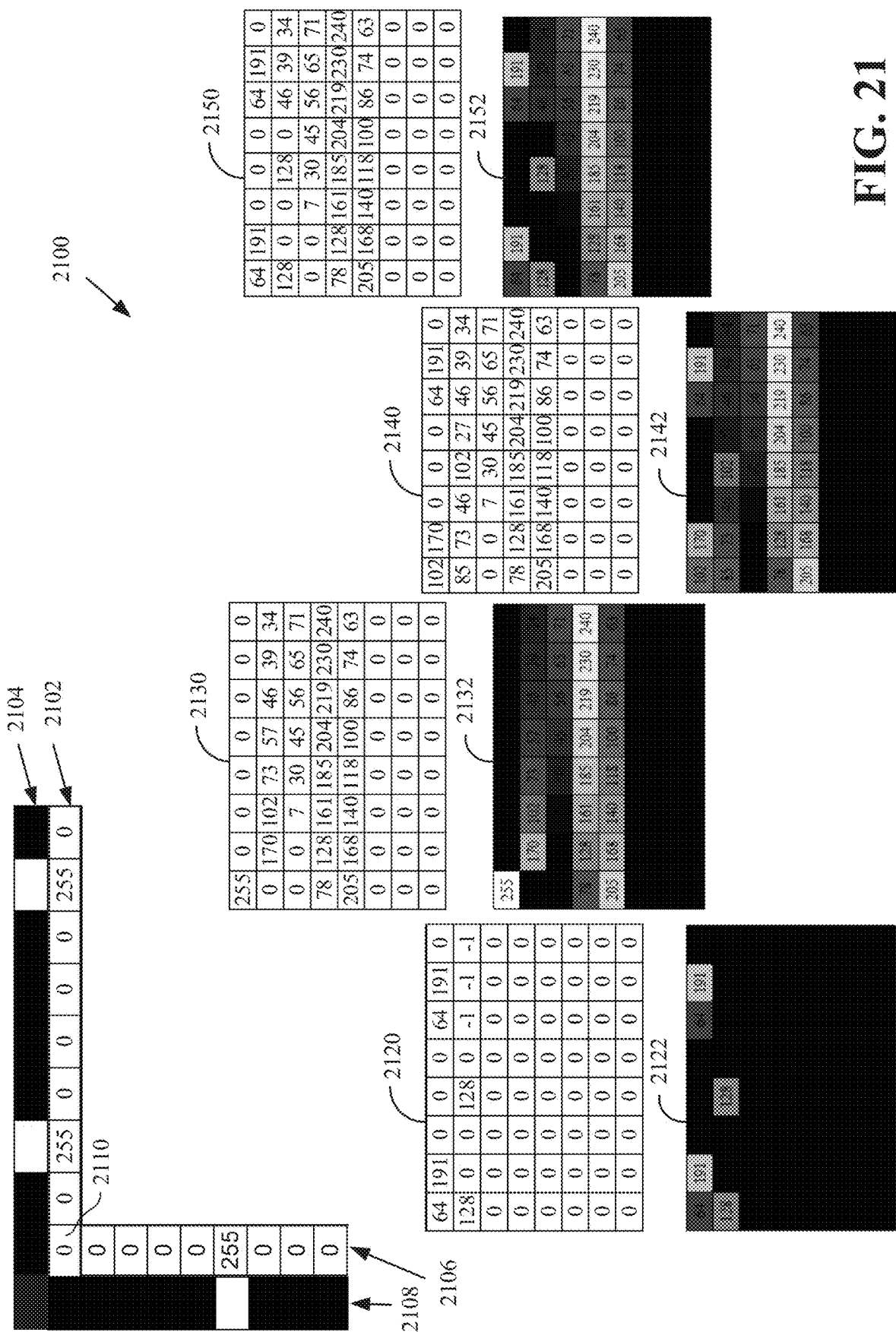
FIG. 21 illustrates examples of the technique of FIG. 19 when the above peripheral pixels are used as the primary peripheral pixels.

FIG. 21 illustrate examples 2100 of the technique of FIG. 19 when the above peripheral pixels are used as the primary peripheral pixels. Example prediction blocks generated using the left peripheral blocks as primary peripheral pixels are not illustrated.

The examples 2100 illustrate different prediction blocks that can be generated using peripheral pixels. The prediction blocks of the examples 2100 are generated using above peripheral pixels 2104 (visualized using above pixels 2104), left peripheral pixels 2106 (visualized using left pixels 2108), or a combination thereof. A top-left peripheral pixel 2110 can be the origin of the coordinate system, as described above.

A prediction block 2120 (visualized as a prediction block 2122) illustrates using only the primary peripheral pixels (i.e., the above peripheral pixels). Thus, even though the left peripheral pixels are available, the prediction block 2120 is generated as described with respect to FIGS. 10-11.

A prediction block 2130 (visualized as a prediction block 2132) illustrates using only the non-primary peripheral pixels (i.e., the left peripheral pixels). Thus, the prediction block 2130 can be generated by using the primary peripheral pixels (i.e., the above peripheral pixels) to obtain position within the above row, as described with respect to positions 2010 of FIG. 20A; obtaining x-intercepts, as described with respect to the block 2012 of FIG. 20A; and calculating the prediction pixel values using the x-intercepts in a similar fashion as described with respect to the prediction block 1102 of FIG. 11.

A prediction block 2140 (visualized as a prediction block 2142) illustrates a prediction block that is generated using a weighted sum, as described above with respect to FIG. 19. A prediction block 2150 (visualized as a prediction block 2152) illustrates a prediction block that is generated using the nearest distance, as described above with respect to FIG. 19.

As mentioned above, intra-prediction modes according to this disclosure can be defined with respect to focal points. A focal point can be defined as a point from which all points of a prediction emanate. That is, each point of the prediction block can be thought to be connected to the focal point. Similarly, a focal point can be thought of as a point in the distance where parallel lines of a perspective image meet.

Figure 14:
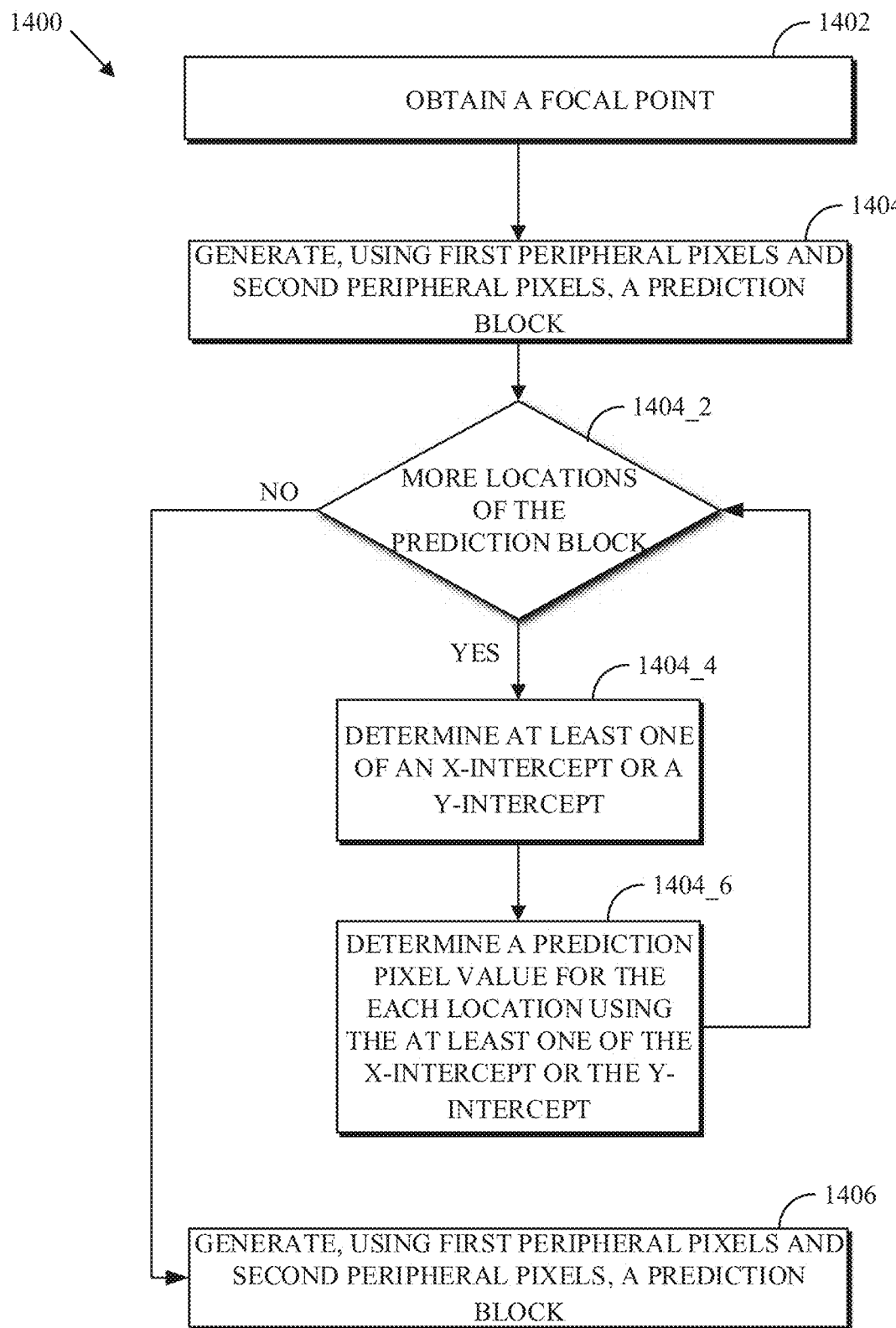
FIG. 14 is a flowchart diagram of a technique for decoding a current block using an intra-prediction mode according to an implementation of this disclosure.

FIG. 14 is a flowchart diagram of a technique 1400 for coding a current block using an intra-prediction mode according to an implementation of this disclosure. The current block is coded using a focal point. The intra prediction mode uses pixels peripheral to the current block. The current block can be as described with respect to the technique 1200 of FIG. 12. The technique 1400 can be implemented in an encoder such as the encoder 400 of FIG. 4. The technique 1400 can be implemented in a decoder such as the decoder 500 of FIG. 5.

The technique 1400 can be implemented, for example, as a software program that can be executed by computing devices such as the transmitting station 102 or the receiving station 106. The software program can include machine-readable instructions that can be stored in a memory such as the memory 204 or the secondary storage 214, and that can be executed by a processor, such as CPU 202, to cause the computing device to perform the technique 1400. In at least some implementations, the technique 1400 can be performed in whole or in part by the intra/inter prediction stage 402 of the encoder 400 of FIG. 4. In other implementations, the technique 1400 can be performed in whole or in part by the intra/inter-prediction stage 508 of the decoder 500 of FIG. 5.

The technique 1400 can be implemented using specialized hardware or firmware. Some computing devices can have multiple memories, multiple processors, or both. The steps or operations of the technique 1400 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

Figure 15:
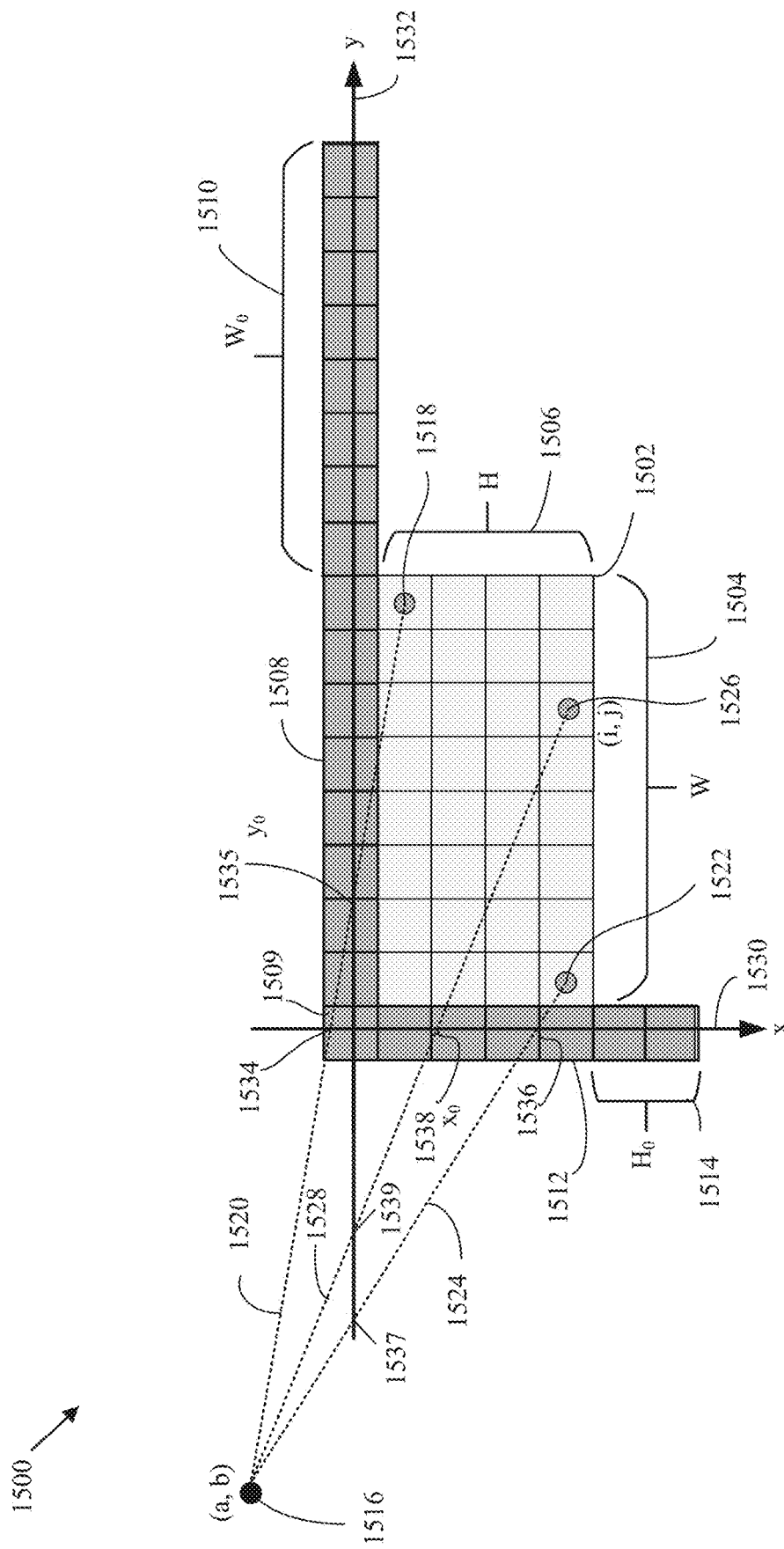
FIG. 15 is an example 1500 illustrating focal points according to implementations of this disclosure.

The technique 1400 can best be understood with reference to FIG. 15 and FIG. 16.

FIG. 15 is an example 1500 illustrating focal points according to implementations of this disclosure. The example 1500 illustrates a current block 1502 that is to be predicted. That is, a prediction block is to be generated for the current block 1502. The current block 1502 has a width 1504 and a height 1506. As such, the current block 1502 is of size W×H. In the example 1500, the current block is shown as being 8×4. However, the disclosure is not so limited. The current block can have any size. For ease of illustration, pixel locations are shown in the example 1500 as squares. The specific value of the pixel can more correctly be thought of as a value that is in the middle (i.e., at the center) of the square.

The current block 1502 is to be predicted using peripheral pixels. The peripheral pixels can be or can include above peripheral pixels 1508. The peripheral pixels can be or can include left peripheral pixels 1512. The above peripheral pixels 1508 can include a number of pixels that is equal to the width 1504 (W). The left peripheral pixels 1512 can include a number of pixels that is equal to the height 1506 (H). For convenience or reference, a top-left peripheral pixel 1509 can be considered to be part of the left peripheral pixels 1512, part of the above peripheral pixels 1508, or part of both the left peripheral pixels 1512 and the above peripheral pixels 1508.

The above peripheral pixels 1508 can include overhang above peripheral pixels 1510. The number of the overhang above peripheral pixels 1508 is denoted $W_0$. In the example 1500, $W_0$ is shown as being equal to 8 pixels. However, the disclosure is not so limited and the overhang above peripheral pixels 1510 can include any number of pixels.

The left peripheral pixels 1512 can include overhang left peripheral pixels 1514. The number of the overhang left peripheral pixels 1514 is denoted $H_0$. In the example 1500, $H_0$ is shown as being equal to 2 pixels. However, the disclosure is not so limited and the overhang left peripheral pixels 1514 can include any number of pixels.

While the left peripheral pixels 1512 are discrete pixels, the left peripheral pixels 1512 can be thought of as being pixel values at integer locations of a continuous peripheral line of pixels. Thus, the left peripheral pixels 1512 (e.g., first peripheral pixels) form a first peripheral pixel line constituting a x-axis 1530. While the above peripheral pixels 1508 are discrete pixels, the above peripheral pixels 1508 can be thought of as being pixel values at integer locations of a continuous peripheral line of pixels. Thus, the above peripheral pixels 1508 (e.g., second peripheral pixels) form a second peripheral pixel line constituting a y-axis 1532.

Three illustrative pixels of the current block 1502 are shown: a pixel 1518 that is at top-right corner of the current block 1502, a pixel 1522 that is at the bottom left corner of the current block 1502, and a pixel 1526. Each of the pixels 1518, 1522, 1526 can be thought of as having the coordinates (i, j) where the center can be at the top-left corner of the current block. Thus, the pixel 1518 is at coordinates (7, 0), the pixel 1522 is at coordinates (0 3), and the pixel 1526 is at coordinates (5, 3).

A focal point 1516 is shown as being outside and at a distance away from the current block. The focal point 1516 is at coordinates (a, b) in the coordinate system that is centered at the cross point between the x-axis 1530 and the y-axis 1532.

As mentioned above, each pixel of the current block 1502 emanates from the focal point 1516. Thus, a line 1520 connects the pixel 1518 and the focal point 1516, a line 1524 connects the pixel 1522 and the focal point 1516, and a line 1528 connects the pixel 1526 and the focal point 1516.

The x-intercept, $x_0$, of the line 1520 (i.e., where the line 1520 crosses the x-axis 1530) is a point 1534, and the y-intercept, $y_0$, of the line 1520 (i.e., where the line 1520 crosses the y-axis 1532) is a point 1535. The x-intercept, $x_0$, of the line 1524 (i.e., where the line 1524 crosses the x-axis 1530) is a point 1536, and the y-intercept, $y_0$, of the line 1524 (i.e., where the line 1524 crosses the y-axis 1532) is a point 1537. The x-intercept, $x_0$, of the line 1528 (i.e., where the line 1528 crosses the x-axis 1530) is a point 1538, and the y-intercept, $y_0$, of the line 1528 (i.e., where the line 1528 crosses the y-axis 1532) is a point 1539.

The point 1534 has a negative value (i.e., is a negative x-intercept). The points 1536 and 1538 have positive values. The point 1535 has a positive value (i.e., is a positive y-intercept). The points 1537 and 1539 are negative values.

As is known, given two points of a line with coordinates (a, b) and (i, j), the x- and y-intercepts can be calculated using equation (1)

$$\begin{cases} \text{x-intercept } x_0 = i - j \times \frac{(a-i)}{(b-j)} \\ \text{y-intercept } y_0 = j - i \times \frac{(b-j)}{(a-i)} \end{cases} \quad (1)$$

FIG. 16 are examples illustrating x- and y-intercepts according to implementations of this disclosure. The examples of FIG. 16 illustrate positive and negative x-intercepts and y-intercepts for a prediction pixel 1604 (or, equivalently, a current pixel) at a location (i, j) of a current block 1612 given different positions of the focal point.

An example 1600 illustrates a focal point 1602 and a line 1606 that passes through (e.g., connects) the prediction pixel 1604 to the focal point 1602. The x-intercept 1608 is a negative value. The y-intercept 1610 is a positive value. An example 1620 illustrates a focal point 1622 and a line 1624 that passes through (e.g., connects) the prediction pixel 1604 to the focal point 1622. The x-intercept 1626 is a positive value. The y-intercept 1628 is a negative value. An example 1640 illustrates a focal point 1642 and a line 1644 that passes through (e.g., connects) the prediction pixel 1604 to the focal point 1642. The x-intercept 1646 is a positive value. The y-intercept 1648 is a positive value.

Returning again to FIG. 14. At 1402, the technique 1400 obtains a focal point. The focal point has coordinates (a, b) in a coordinate system, as described with respect to FIG. 15.

When implemented by a decoder, obtaining the focal point can include decoding, from a compressed bitstream, the intra-prediction mode. The compressed bitstream can be the compressed bitstream 420 of FIG. 5. The intra-prediction mode can be indicative of the focal point.

In an example, each intra-prediction mode of available intra-prediction modes can be associated with an index (e.g., a value). Decoding the index from the compressed bitstream instructs the decoder to perform intra-prediction of the current block according to the intra-prediction mode (i.e., the semantics of the intra-prediction mode). In an example, an intra-prediction mode can be indicative of the coordinates of the focal point. For example, an intra-prediction mode value of 45 may indicate that the focal point is at coordinates (−1000, −1000), an intra-prediction mode value of 46 may indicate that the focal point is at coordinates (−1000, −850), and so on. Thus, if, for example, 64 focal points are possible, then 64 intra-prediction modes are possible, each indicating a location for the focal point. In an example, 100s of focal points (and, equivalently, intra-prediction modes) available. While, the locations of focal points re given herein in Cartesian coordinates, the focal coordinates can be given in polar coordinates. The angle of the polar coordinate can be with respect to the x-axis, such as the x-axis 1530 of FIG. 15.

In another example, obtaining the focal point can include decoding the coordinates of the focal points from the compressed bitstream. For example, the compressed bitstream can include an intra-prediction mode indicative of intra-prediction using a focal point followed by the coordinates of the focal point.

When implemented by an encoder, obtaining the focal point can include selecting the focal point from a plurality of candidate focal points. That is, the encoder selects an optimal focal point for encoding the current block. The optimal focal point can be one that results in the most optimal encoding of the current block. In an example, the plurality of candidate focal points can be partitioned into groups of candidate focal points. Each group of candidate focal points can be arranged on a circumference of a respective circle. In an example, each group of candidate focal points can include 16 candidate focal points.

Figure 17:
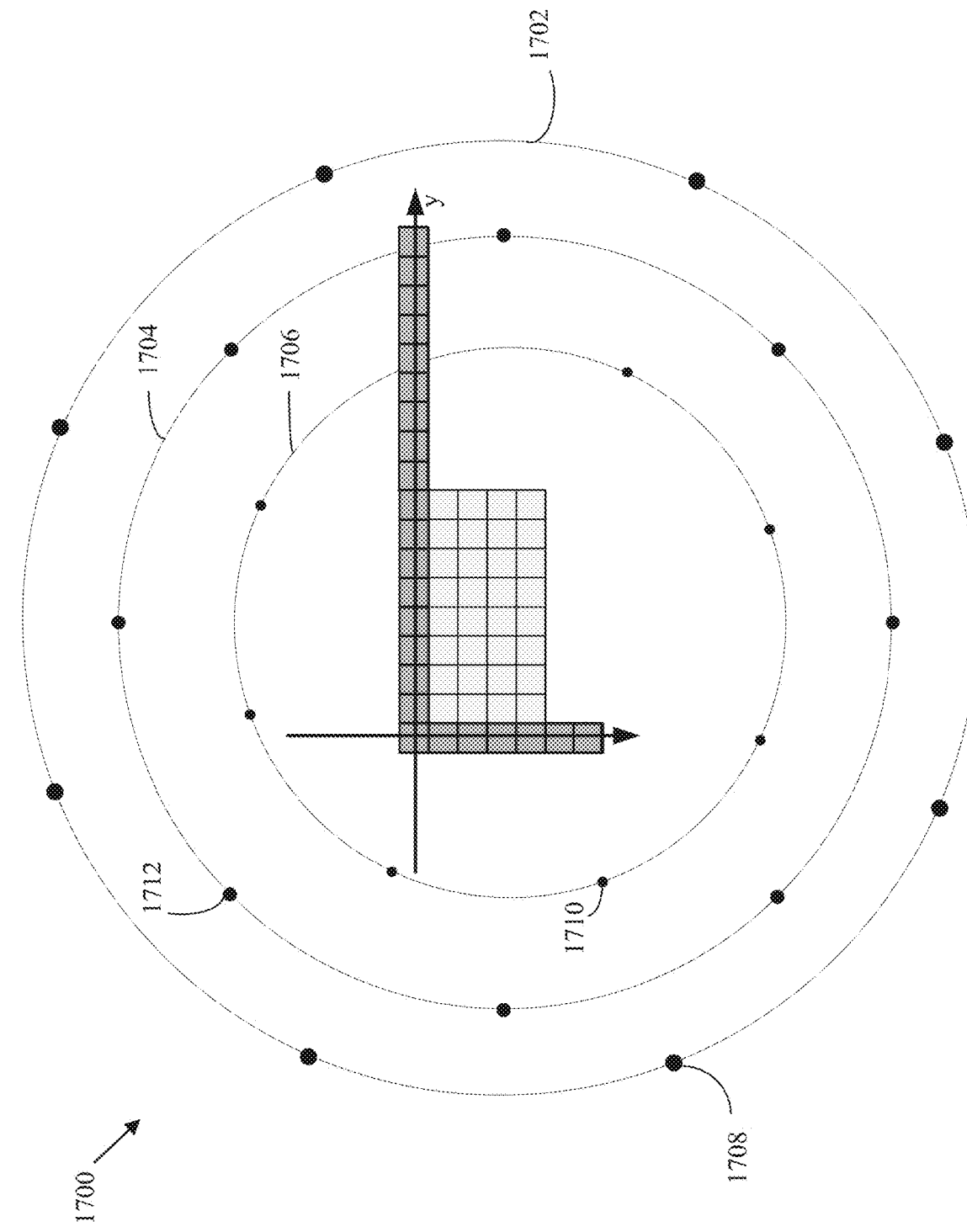
FIG. 17 illustrates an example of groups of focal points according to implementations of this disclosure.

FIG. 17 illustrates an example 1700 of groups of focal points according to implementations of this disclosure. As mentioned above, there could be 100s of focal point candidates, which can be anywhere in the space outside of the current block. The focal point candidates are a subset of all possible focal points that are in the space outside the current block. The space outside of the current block can be centered (i.e., have an origin) at a top-left peripheral pixel, such as the top-left peripheral pixel 1509 of FIG. 15. The center of the space can be any other point. In an example, the center can be the center point of the current block.

To limit the search space, only a subset of all possible focal points can be considered candidate focal points. There can be many ways of reducing the search space into candidate focal points. In an example, the candidate focal points can be grouped into groups. Each group of candidate focal points can be arranged on the circumference of a circle. In an example, three circles can be considered. The three circles can be a shell 1702, a shell 1704, and a shell 1706. Focal points are illustrated as black circles (such as focal points 1708-1712) on each shell. However, any number of circles can be available. Each circle (or shell) corresponds roughly to slopes (e.g., convergence rates) of the lines connecting the prediction pixels to focal points on the circumference of the circle. It is noted that the example 1700 is a mere illustration and is not drawn to scale.

The shell 1702 can correspond to far away focal points. As such, given a focal point on the shell 1702, the slopes of the lines from each prediction pixel location to the focal point can be roughly the same. The shell 1702 can have a radius in the range of 1000s of pixels. The more distant the focal point, the more the intra-prediction using the distant focal point can resemble (e.g., approximate) a directional intra-prediction.

The shell 1706 can correspond to close-by focal points. As such, given a focal point on the shell 1702, the lines from the focal point to each prediction pixel location can appear to be fanning out. Thus, the slopes of the lines can be very different. The shell 1706 can have a radius in the range of 10s of pixels. For example, the radius can be 20, 30, or some other such number of pixels.

The shell 1704 can correspond to a circle with a medium-sized radius. The radius of the shell 1704 can be in the range of 100s of pixels.

As eluded to above, while a circle (a shell) can have an impractical number of focal points, only a sampling of the focal points are used as candidate focal points. The candidate focal points of each group (i.e., on each shell) can be equally spaced. For example, assuming that N (e.g., 8, 16, etc.) number of candidate focal points are included in each group, then the N focal points can be 360/N (e.g., 45, 22.5, etc.) degrees apart.

In an example, obtaining a focal point at 1402 in an encoder can include testing each of the candidate focal points to identity the optimal focal point. In another example, an outer-most optimal focal point of the outer most shell (the shell 1702) can be identified by performing an intra-prediction using each of the focal points of the outer most shell. Focal points corresponding to (e.g., at the same angle at) the outer-most optimal focal point can then be tried to determine whether any of them results in a more optimal prediction block. Other heuristic approaches can also be used. For example, a binary search can be used.

Returning to FIG. 14. At 1404, the technique 1400 can generate, using first peripheral pixels and second peripheral pixels, a prediction block. The first peripheral pixels can be the left peripheral pixels, such as left peripheral pixels 1512 (including the top-left peripheral pixel 1509). The second peripheral pixels can be the above peripheral pixels 1508.

As mentioned above, the first peripheral pixels form a first peripheral pixel line constituting an x-axis, such as the x-axis 1530 of FIG. 15; the second peripheral pixels form a second peripheral pixel line constituting a y-axis, such as the y-axis 1532 of FIG. 15; and the first peripheral pixel line and the second peripheral pixel line form the coordinate system having an origin. Generating the prediction block can include performing 1404_4-1404-6 for each location (i.e., for each pixel) of the prediction block. Each pixel of the prediction block is at a location (i, j). If the block is of size M×N, then 1404_4-1404_6 are performed M*N times.

At 1404_2, the technique 1400 determines whether there are any more prediction block locations for which a pixel value has not been determined (e.g., calculated). If there are more pixel locations, then the technique 1400 proceeds to 1404_4; otherwise, the technique 1400 proceeds to 1406.

At 1404_4, the technique 1400 can determine (e.g., calculate, identify, etc.) at least one of an x-intercept or a y-intercept for the prediction pixel at (i, j).

The x-intercept is a first point (e.g., the x-intercept 1608, the x-intercept 1626, the x-intercept 1646) at which a line (e.g., the line 1606, the line 1624, the line 1644) formed by a point centered at the each location of the prediction block (e.g., the prediction pixel 1604) and the focal point (e.g., the focal point 1602, the focal point 1622, the focal point 1642) crosses the first peripheral pixel line (e.g., the x-axis).

The y-intercept is a second point (e.g., the y-intercept 1609, the y-intercept 1627, the y-intercept 1647) at which the line (e.g., the line 1606, the line 1624, the line 1644) formed by the point centered at the each location of the prediction block (e.g., the prediction pixel 1604) and the focal point (e.g., the focal point 1602, the focal point 1622, the focal point 1642) crosses the second peripheral pixel line (e.g., the y-axis).

The x- and/or y-intercepts can be calculated using equation (1). However, in some situations, the line that passes through the prediction pixel and the focal point may not intercept one of the axes. For example a line that is nearly parallel to the x-axis may not be considered to intercept the x-axis; and a line that is nearly parallel to the y-axis may not be considered to intercept the y-axis. A line may not be considered to intercept the x-axis when b=j+ε; and a line may not be considered to intercept the y-axis when a=i+ε, where ε is a small threshold that is close to zero. As such, the x-intercept can be identified as i and the y-intercept can be identified as j without having to use the equation (1).

At 1404_6, the technique 1400 can determine a prediction pixel value for the each location (i.e., (i, j)) of the prediction block using the at least one of the x-intercept or the y-intercept. From 1404_6, the technique 1400 proceeds back to 1404_2.

In an example, determining the prediction pixel value can include, on a condition that one of the at least one of the x-intercept or the y-intercept is a negative value, determining the prediction pixel value for the each location using the other of the at least one of the x-intercept or the y-intercept. For example, with respect to the example 1600 of FIG. 16, as the x-intercept 1608 is a negative value, the prediction pixel value for the location (i, j) of the prediction block is calculated using only the y-intercept 1610, which is a positive value. For example, with respect to the example 1620 of FIG. 16, as the y-intercept 1628 is a negative value, the prediction pixel value for the location (i, j) of the prediction block is calculated using only the x-intercept 1626, which is a positive value.

In an example, determining the prediction pixel value can include, on a condition that the x-intercept is positive and the y-intercept is positive, determining the prediction pixel value for the each location as a weighted combination of a first pixel value at the x-intercept and a second pixel value at the y-intercept.

In an example, determining the prediction pixel value can include, on a condition that i is equal to a (i.e., i is very close to a), setting a pixel value at the each location of the prediction block to a value of a first peripheral pixel of the first peripheral pixels that is at position i of the first peripheral pixel line. That is, if i≈a, then set p(i, j)=L[i]. That is, if the line is almost parallel to the y-axis, set the prediction pixel value p(i, j) to the horizontally corresponding left peripheral pixel value, L[i].

Similarly, in an example, determining the prediction pixel value can include, on a condition that j is equal to b (i.e, j is very close to b), setting a pixel value at the each location of the prediction block to a value of a second peripheral pixel of the second peripheral pixels that is at position j of the second peripheral pixel line. That is, if j≈b, then set p(i, j)=T[j]. That is, if the line is almost parallel to the x-axis, set the prediction pixel value p(i, j) to the vertically corresponding above (i.e., top) peripheral pixel value, T[j].

In an example, determining the prediction pixel value can include, on a condition that the x-intercept is zero and the y-intercept is zero, setting a pixel value at the each location of the prediction block to a pixel value at an intersection of the first peripheral pixel line and second peripheral pixel line. That is if the x- and the y-intercepts are zero, the prediction pixel value can be set to the top-left peripheral pixel value.

The pseudocode of Table I illustrates an example of setting the prediction pixel value, p(i, j) at a location (i, j) of the prediction block using a focal point at (a, b), where i=0, . . . , width-1 and j=0, . . . , height-1.

As mentioned above, for a given pixel (i, j), a line is drawn joining a focal point at (a, b) and (i, j). The x- and y-intercepts are calculated. Depending on these intercepts, the predicted pixel value p(i, j) is obtained by interpolating or extrapolating the intercept values from the boundary pixels on the top or the left.

Specifically, let L[k] denote the array of the left boundary pixels (e.g., the left peripheral pixels 1512 plus the top-left peripheral pixel 1509 of FIG. 15) for positive integer locations k with k=0, 1, . . . , H+H$_0$; and T[k] denote the array of top boundary pixels (e.g., the above peripheral pixels 1508 plus the top-left peripheral pixel 1509 of FIG. 15) for positive integer locations k with k=0, 1, . . . , W+W$_0$. Note T[0]=L[0]. Also let f$_L$(z) and f$_T$(z) denote interpolating functions at a high precision (real-valued) point z obtained from boundary pixels L[k], T[k] by a suitable interpolant (i.e., an interpolation function). Note that at integer locations k(z)=L[k] for z=k=0, 1, . . . , H+H$_0$, and f$_T$(z)=T[k] for z=k=0, 1, . . . , W+W$_0$.

TABLE I

Setting p(i, j) using focal point at (a, b)

```
1    if ( i == a ) {
2      p(i , j) = L[i]
3    } else if ( j == b) {
4      p(i, j) = T[j]
5    } else {
6      x-intercept x_0 calculated using equation (1)
7      y-intercept y_0 calculated using equation (1)
8      If ( x_0 == 0 && y_0 == 0 ) {
9        p(i, j) = L[0]
10     } else if ( x_0 >= 0 && y_0 < 0 ) {
11       p(i, j) = f_L(x_0)
12     } else if ( x_0 < 0 && y_0 >= 0 ) {
13       p(i, j) = f_T(y_0)
14     } else if (x_0 >= 0 && y_0 >= 0) {
15       if (x_0 >= y_0 ) {
16         p(i, j) = (j/x_0) * f_L(x_0) + ( (x_0-i/x_0) *f_T(y_0)
17       } else {
18         p(i, j) = (j/y_0) * f_L(x_0) + ( (y_0-j/y_0) *f_T(y_0)
19       }
20     } else {
21       //not possible
22     }
23   }
```

At row 1 of Table I, if the focal point and the prediction pixel at (i, j) are on the same horizontal line, then, at row 2, the prediction pixel p(i, j) is set to the value of the left peripheral pixel that is on the same horizontal line, L[i]. To be more specific, the focal point and the prediction pixel may not be completely horizontally aligned. Thus, (i==a) can mean that the line that connects the focal point and the prediction pixel pass through the square that is centered at L[i].

At row 3, if the focal point and the prediction pixel are on the same vertical line, then, at row 4, the prediction pixel p(i, j) is set to the value of the above peripheral pixel that is on the same vertical line, T[j]. To be more specific, the focal point and the prediction pixel may not be completely vertically aligned. Thus, (j==b) can mean that the line that connects the focal point and the prediction pixel pass through the square that is centered at T[j].

At rows 6-7, the x-intercept (x$_0$) and the y-intercept (y$_0$) are calculated according to equation (1). At row 8, if the x-intercept (x$_0$) and y-intercept (y$_0$) are at the origin, then, at row 9, the prediction pixel p(i, j) is set to the top-left peripheral pixel, L[0]. To be more specific, the x-intercept (x$_0$) and/or the y-intercept (y$_0$) may not be exactly zero. Thus, x$_0$==0 && y$_0$==0 can mean that the x-intercept and the y-intercept are within the square (i.e., the pixel) that is centered by the origin.

At row 10, if the x-intercept (x$_0$) is positive but the y-intercept (y$_0$) is negative, then, at row 11, the prediction pixel is derived only from the x-intercept (x$_0$) using the interpolant function f$_L$. At row 12, if the x-intercept (x$_0$) is negative and the y-intercept (y$_0$) is positive, then, at row 13, the prediction pixel (pi, j) is derived only from the y-intercept (y$_0$) using the interpolant function f$_T$.

At row 14, if both the x-intercept (x$_0$) and the y-intercept (y$_0$) are positive values, then the prediction pixel p(i, j) is calculated as a weighted combination of the interpolation of the x-intercept (x$_0$) (i.e., f$_L$(x$_0$)) and the interpolation of the y-intercept ($y_0$) (i.e., $f_T(y_0)$). Which is weighed more depends on which of x-intercept ($x_0$) and the y-intercept ($y_0$) is farther from the prediction pixel, p(i, j). if the x-intercept ($x_0$) is farther (i.e., row 15), then, at row 16, the y-intercept ($y_0$) is weighed more. On the other hand, if the y-intercept ($x_0$) is farther (i.e., row 17), then, at row 18, the x-intercept ($x_0$) is weighed more. Rows 20-21 are for completeness purposes and are intended to cover a situation where both the x-intercept ($x_0$) and the y-intercept ($y_0$) are negative, which is a situation that cannot happen.

In some situations, at least some of the top peripheral pixels or the left peripheral pixels may not be available. For example, the current block can be a block that is at the top edge of the image or at the left edge of the image. In such situations, the unavailable peripheral pixels can be considered to have a value of zero.

The interpolation functions, $f_L$ and $f_T$, can be any interpolation functions. The interpolation functions can be the same interpolation function or different interpolation functions. The interpolation functions can be as described above with respect to FIG. 9. For example, the interpolation function can be finite impulse response (FIR) filters. For example, the interpolation filters can be bilinear interpolations, as described above. That is, given an x-intercept (or a y-intercept) value, the closest integer pixels can be determined and a weighted sum of the closest integer pixels can be used in a bilinear interpolation. Interpolation, as used herein, encompasses both interpolations and extrapolations.

Returning to FIG. 14, at 1406, the technique 1400 codes a residual block corresponding to a difference between the current block and the prediction block. When implemented by an encoder, the technique 1400 calculates the residual block as the difference between the current block and the prediction block and encodes the residual block in a compressed bitstream. When implemented by a decoder, the technique 1400 codes the residual block by decoding the residual block from a compressed bitstream. The decoder can then add the residual block to the prediction block to reconstruct the current block.

Another aspect of the disclosed implementation is a technique for encoding a current block. The technique includes obtaining a prediction block of prediction pixels for the current block using peripheral pixels. Each prediction pixel is at a respective location (i, j) within the prediction block. Obtaining the prediction block can include obtaining a focal point, the focal point having coordinates (a, b) in a coordinate system; and, for each location of the prediction block, obtaining a line indicative of a respective prediction angle, and determining a pixel value for the each location using the line. As described above, the line connects the focal point to the each location. The focal point can be outside of the current block and the focal point may, but may not, be one of the peripheral pixels, as described with respect to FIGS. 15-17. As described above, each prediction pixel of the prediction block can have a prediction angle that is different than the prediction angle of every other prediction pixel of the prediction angle. While, depending on the location of the focal point, more than one prediction pixel can have the same prediction angle, the intra-prediction modes according to implementations of this disclosure are such that not all of the prediction pixels can have the same prediction angle.

Encoding the current block can include encoding, in the compressed bitstream, an intra-prediction mode indicative of the focal point. As mentioned above, a value associated with the intra-prediction mode can indicate the location of the focal point.

As described above, the peripheral pixels can include left peripheral pixels and top peripheral pixels. Determining the pixel value for the each location using the line can include determining an x-intercept of the line; determining a y-intercept of the line; and determining the pixel value using the x-intercept and the y-intercept. The x-intercept is a first point at which the line crosses a left axis that includes the left peripheral pixels of the current block. The y-intercept is a second point at which the line crosses a top axis that includes the top peripheral pixels of the current block.

Obtaining the focal point, as described above and with respect to FIG. 17, can include selecting, the focal point, from a plurality of candidate focal points. The plurality of candidate focal points can be partitioned into groups of candidate focal points. Each group of candidate focal points can be arranged on a circumference of a respective circle.

Another aspect of the disclosed implementation is a technique for decoding a current block. The technique includes decoding, from a compressed bitstream, a focal point; obtaining a prediction block of prediction pixels for the current block; and reconstructing the current block using the prediction block. Obtaining a prediction block includes, for each location of the prediction block, obtaining a line indicative of a respective prediction angle, where the line connects the focal point to the each location; and determining a pixel value for the each location using the line.

Determining the pixel value for the each location using the line can include determining an x-intercept of the line; determining a y-intercept of the line; and determining the pixel value using the x-intercept and the y-intercept. The x-intercept is a first point at which the line crosses a left axis comprising left peripheral pixels of the current block. The y-intercept is a second point at which the line crosses a top axis comprising top peripheral pixels of the current block.

Determine the pixel value using the x-intercept and the y-intercept can include determining the pixel value as a weighted combination of a first pixel value at the x-intercept and a second pixel value at the y-intercept. Determine the pixel value using the x-intercept and the y-intercept can include, on a condition that one of the x-intercept or the y-intercept is a negative value, determining the pixel value using the other of the x-intercept or the y-intercept. Decoding, from the compressed bitstream, the focal point can include decoding, from the compressed bitstream, an intra-prediction mode that is indicative of the focal point.

For simplicity of explanation, the techniques 900, 1200, 1300, 1400, 1800, and 1900 are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a computer or processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for intra-prediction of a current block, comprising:
    selecting peripheral pixels of the current block, wherein the peripheral pixels are used to generate a prediction block for the current block;
    for each prediction pixel of the prediction block, performing steps comprising:
        selecting, based on intra-prediction mode parameters, two respective pixels of the peripheral pixels, wherein the intra-prediction mode parameters result in adjusting positions along a peripheral pixel line and in varying prediction angles such that different prediction pixels of the prediction block have different prediction angles; and
        calculating the prediction pixel by interpolating at least the two respective pixels; and
    coding a residual block corresponding to a difference between the current block and the prediction block.

2. The method of claim 1, wherein selecting the two respective pixels of the peripheral pixels comprises:
    selecting first two respective pixels of the peripheral pixels for calculating a first prediction pixel of the prediction block; and
    selecting second two respective pixels of the peripheral pixels for calculating a second prediction pixel of the prediction block,
        wherein the second prediction pixel is a neighboring pixel of the first prediction pixel along a first dimension,
        wherein the first two respective pixels and the second two respective pixels are selected according to the intra-prediction mode parameters.

3. The method of claim 2, wherein the intra-prediction mode parameters comprise at least two of a first offset along a first direction, a first step along the first direction, or a first acceleration along the first dimension,
    wherein the first offset indicates an initial prediction angle for predicting a first pixel of a top row or a left-most column of the prediction block,
    wherein the first step indicates an initial pixel position, along a line of the peripheral pixels, from which to derive a respective value of a next pixel of a new row k or column k as compared to a position of a preceding pixel of a row or column k−1, and
    wherein the first acceleration indicates a change to the first step that is added to each subsequent first step.

4. The method of claim 3, wherein the first offset is selected from a limited range of values based on a step value.

5. The method of claim 3, wherein the first step is selected from a range of −4 to +4 using a step value of 0.25.

6. The method of claim 3, wherein the first acceleration is 0 or 1.

7. The method of claim 3, wherein:
the first direction is a horizontal direction,
the intra-prediction mode parameters further comprise at least two of a vertical offset, a vertical step, or a vertical acceleration,
wherein the vertical offset is indicative of a first change to the first offset to be applied to each subsequent row of the prediction block,
wherein the vertical step is indicative of a second change to the first step to be applied to the each subsequent row of the prediction block, and
wherein the vertical acceleration is indicative of a third change to the first acceleration to be applied to the each subsequent row of the prediction block.

8. The method of claim 7, wherein calculating the prediction pixel by interpolating at least the two respective pixels comprises:
calculating the prediction pixel using bilinear interpolation.

9. The method of claim 2, further comprising:
decoding the intra-prediction mode parameters from a compressed bitstream.

10. The method of claim 2, wherein the intra-prediction mode parameters are derived by predicting the peripheral pixels from other pixels of a previously reconstructed block that includes the peripheral pixels.

11. An apparatus for intra-prediction of a current block, comprising:
a memory; and
a processor, the processor configured to execute instructions stored in the memory to:
select first peripheral pixels of the current block, wherein the first peripheral pixels are along a first edge of the current block;
for each prediction pixel of a prediction block for the current block, perform instructions to:
determine, based on intra-prediction mode parameters, a first intercept along a first continuous line that includes the first peripheral pixels at respective integer locations, wherein the intra-prediction mode parameters result in adjusting positions along a peripheral pixel line and in varying prediction angles such that different prediction pixels of the prediction block have different prediction angles;
determine, using a location of the each prediction pixel and the first intercept, a second intercept along a second continuous line,
wherein the second continuous line includes second peripheral pixels,
wherein the second peripheral pixels are along a second edge of the current block, and
wherein the second edge is perpendicular to the first edge; and
calculate, using at least one of the first intercept and the second intercept,
a value for the each prediction pixel; and
code a residual block corresponding to a difference between the current block and the prediction block.

12. The apparatus of claim 11, wherein to calculate, using at least one of the first intercept and the second intercept, the value for the each prediction pixel comprises to:
calculate the value for the each prediction pixel as a weighted sum of the first intercept and the second intercept.

13. The apparatus of claim 11, wherein to calculate, using at least one of the first intercept and the second intercept, the value for the each prediction pixel comprises to:
calculate the value for the each prediction pixel using the one of the first intercept or the second intercept that is nearest to a location of the each prediction pixel.

14. The apparatus of claim 11, wherein the instructions further comprise instructions to:
receive, in a compressed bitstream, a first indication of which of the first peripheral pixels or the second peripheral pixels to use as primary pixels for generating the prediction block; and
receive, in the compressed bitstream, a second indication of a function to combine the first peripheral pixels and the second peripheral pixels to obtain the prediction block.

15. The apparatus of claim 14, wherein the second indication indicates at least one of using a weighted sum or a nearest distance.

16. A method of generating a prediction block for a current block using intra-prediction, comprising:
determining peripheral pixels for generating the prediction block of the current block, wherein the peripheral pixels is integer pixel locations along a peripheral pixel line;
determining, based on intra-prediction mode parameters, a respective sub-pixel location of the peripheral pixel line for each pixel of the prediction block, wherein the intra-prediction mode parameters result in adjusting positions along the peripheral pixel line and in varying prediction angles such that different prediction pixels of the prediction block have different prediction angles; and
for each prediction pixel of the prediction block, calculating the prediction pixel as an interpolation of nearest integer pixels of the peripheral pixels corresponding to the respective sub-pixel location of the each prediction pixel.

17. The method of claim 16, wherein determining the respective sub-pixel location of the peripheral pixels for each pixel of the prediction block, comprising:
for each row pixel of a first row of the prediction block, determining the respective sub-pixel location using the intra-prediction mode parameters comprising at least two of a horizontal offset, a horizontal step, or a horizontal acceleration,
wherein the horizontal offset is indicative of an initial prediction angle,
wherein the horizontal step is used as a subsequent horizontal offset for subsequent prediction pixels of a same row, and
wherein the horizontal acceleration is indicative of a change to the horizontal offset that is added to each subsequent horizontal step.

18. The method of claim 17, wherein determining the respective sub-pixel location of the peripheral pixels for each pixel of the prediction block comprises:
determining the respective sub-pixel location of each pixel of a second row of the prediction block, wherein the intra-prediction mode parameters further comprise at least two of a vertical offset, a vertical step, or a vertical acceleration,
wherein the vertical offset is indicative of a first change to the horizontal offset to be applied to each subsequent row of the prediction block,
wherein the vertical step is indicative of a second change to the horizontal step to be applied to the each subsequent row of the prediction block, and wherein the vertical acceleration is indicative of a third change to the horizontal acceleration to be applied to the each subsequent row of the prediction block.

19. The method of claim 18, wherein the method is implemented by a decoder, the method further comprising:
   decoding the intra-prediction mode parameters from a compressed bitstream.

20. The method of claim 19, wherein decoding the intra-prediction mode parameters from the compressed bitstream comprises:
   decoding parameter differences;
   deriving predicted parameter values; and
   for each parameter of the intra-prediction mode parameters, adding a respective parameter difference to a respective predicted parameter value.

* * * * *